(12) United States Patent
Kidd et al.

(10) Patent No.: US 7,469,217 B2
(45) Date of Patent: Dec. 23, 2008

(54) PRODUCT TOOLKIT SYSTEM AND METHOD

(75) Inventors: Susan O. Kidd, Falls Church, VA (US);
Mitchell R. Sacks, McLean, VA (US);
Peter A. Bassey, Silver Spring, MD
(US); Siamak Khodaei, Alexandria, VA
(US); Scott A. Abe, Silver Spring, MD
(US); Baoren Liu, Reston, VA (US);
Jagadish Kiran, Reston, VA (US);
Zhongyu Wong, North Potomac, MD
(US); Reddy S. Pathepuram, Herndon,
VA (US); Roderick A. Avery,
Washington, DC (US); **Jon H.
Brundage**, Frederick, MD (US)

(73) Assignee: Savvis Communications Corporation, Town and Country, MI (US)

( * ) Notice: Subject to any disclaimer, the term of this patent is extended or adjusted under 35 U.S.C. 154(b) by 775 days.

(21) Appl. No.: 10/315,214

(22) Filed: Dec. 10, 2002

(65) Prior Publication Data

US 2004/0111327 A1     Jun. 10, 2004

(51) Int. Cl.
*G06Q 30/00*     (2006.01)
(52) U.S. Cl. .......................... 705/26; 705/37
(58) Field of Classification Search .................... 705/26, 705/37

See application file for complete search history.

(56) References Cited

U.S. PATENT DOCUMENTS

| | | | |
|---|---|---|---|
| 4,974,160 A | 11/1990 | Bone et al. | |
| 5,146,404 A | 9/1992 | Calloway et al. | |
| 5,825,651 A | 10/1998 | Gupta et al. | |
| 5,864,480 A | 1/1999 | Ladd | |
| 5,878,400 A | 3/1999 | Carter, III | |
| 4,974,160 A | 11/1999 | Bone et al. | |
| 6,006,195 A | 12/1999 | Marchak et al. | |
| 6,035,305 A | 3/2000 | Strevey et al. | |
| 6,092,069 A | 7/2000 | Johnson et al. | |
| 6,104,868 A | 8/2000 | Peters et al. | |
| 6,128,600 A | 10/2000 | Imamura et al. | |
| 6,138,104 A | 10/2000 | Marchak et al. | |
| 6,223,094 B1 | 4/2001 | Muehleck et al. | |
| 6,233,493 B1 | 5/2001 | Cherneff et al. | |
| 6,263,341 B1 | 7/2001 | Smiley | |
| 6,338,067 B1 | 1/2002 | Baker et al. | |
| 6,734,878 B1 * | 5/2004 | DeLuca et al. | 715/735 |
| 2001/0013004 A1 * | 8/2001 | Haris et al. | 705/1 |
| 2002/0022952 A1 | 2/2002 | Zager et al. | |
| 2002/0026368 A1 | 2/2002 | Carter, III | |
| 2002/0042755 A1 | 4/2002 | Kumar et al. | |

OTHER PUBLICATIONS

Fogliata, et al., Network management for multi-technology transport networks, Alcatel Telecommunications Review n 3 2000. p. 211-220, downloaded from Dialog Web on the Internet on Mar. 29, 2008.*

* cited by examiner

*Primary Examiner*—James Zurita
(74) *Attorney, Agent, or Firm*—Kenyon & Kenyon LLP

(57) ABSTRACT

A product toolkit system and method that tracks and maintains various product configurations of arrangements of product components available from various organizations throughout an enterprise. The product toolkit receives product component information, correlates component information and product management information and outputs product configuration information to a user.

28 Claims, 20 Drawing Sheets

Copyright 2002 Cable and Wireless plc. All rights reserved.

This report lists the data for *3RD PARTY CONTACT CENTRE APPLICATIONS - AUTOMATED DIALLERS Product*

This report is generated based on the following selected option:
- Show All Options 801 — Family    802 — Product Family Data    1001 — Reporting Category Description

| Reporting Category |

TELEBUSINESS    CONTACT CENTRE    CALL CENTRE APPLICATIONS

803 — Product    810 — Product Identifier    811 — Product Description    812 — Product Data    1002 — Manager Name    1003 — Manager Phone Number    1003 — Creation Date    1004 — Effective Date    1005 — Expiration Date 3RD PARTY CONTACT CENTRE APPLICATIONS - AUTOMATED DIALLERS    P0066    AUTOMATED PREDICTIVE DIALLER - INTELLIGENTLY PREDICTS WHEN TO AUTO DIAL A NUMBER FROM A DEFINED DATABASE AND SYNCHRONISE WITH AN AVAILABLE AGENT TO CONVERSE WITH THE CALLER. TYPICALLY FOUND IN CALL CENTRES - USED ACROSS A NUMBER OF VERTICAL MARKETS.    FRED SMITH    999-99 9999    01-JAN-2002    01-JAN-2002    01-MAR-2033

806 — 805 — 804 — 1003    1004    1005    1006 Product Instance Data    1007    808

| Product Version | Selling Geography | Sales Channel | Creation Date | Effective Date | Expiration Date | Last Update Date | Last Update ID | Product Instance Status | Life Cycle Status | SAP Code |

Copyright 2002 Cable and Wireless plc. All rights reserved.

Copyright 2002 Cable and Wireless plc. All rights reserved.

PRODUCT TOOLKIT SYSTEM AND METHOD

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND OF THE INVENTION

1. Field of the Invention

Embodiments of the present invention relate generally to product information management and, more particularly, to automated systems and methods for product information management.

2. General Background and Description of Related Art

Software-based products and services play a significant role in today's global economy. The advent of computer networks and modular software development techniques has led to the ability to variously combine product components to form many different product configurations. This ability permits a product provider to determine a product configuration, or set of product options, that closely matches the needs of a given customer or group of customers.

The modern business enterprise (e.g., company, corporation, joint venture, etc.) may include multiple geographically dispersed business units that each produce or contribute components or a portion of the organization's products. Multiple and discrepant sources of product information can result in varying definitions of the products sold, where they are sold and how they are sold. Associated product manuals and redundant efforts can result in excessive and unnecessary costs that reduce overall profitability. Furthermore, without a single source of information for existing products and systems, new products/new systems may be built from scratch instead of re-using existing products or product components.

Communication between sales channels and geographies may not avoid this duplication of effort absent a single source of information. To determine the optimum solution for their customers, an organization may benefit from shared institutional knowledge regarding particular product components. Such shared information may include product component functions, inter-component compatibility, availability dates, cost, support availability, and product features, for example.

BRIEF DESCRIPTION OF THE DRAWINGS

The present invention will be readily appreciated and understood from consideration of the following detailed description of at least one exemplary embodiment of this invention, when taken with the accompanying drawings, in which same numbered elements are identical and:

FIG. 10 is an example of a product hierarchy report according to at least one embodiment of the invention;

DETAILED DESCRIPTION OF THE EMBODIMENTS

At least one embodiment of the present invention relates to the use of a computer system for capturing, arranging, and configuring product information and product component information for the products and components supplied by an organization, where such information may be collected from various entities (e.g., business units) from different geographic locations of the organization.

In accordance with at least one embodiment of the invention, a product toolkit system and method may be provided for capturing, organizing, and outputting product information and product component information. Embodiments of a product toolkit may utilize a computer-based system. In particular, in various embodiments, portions of the systems and methods described herein may be fully or partially automated using a computer or computers executing a sequence of programmed instructions. For example, a product toolkit, according to at least one embodiment, may include a software application to be executed using a computing system and a database.

A single system for management and organization-wide distribution of product component information provides a number of benefits, including, but not limited to, reducing operating costs due to unnecessary redundant product component development, eliminating local inaccuracies in product data, and providing a single trusted source of product information for the organization's sales operations.

Figure 1:
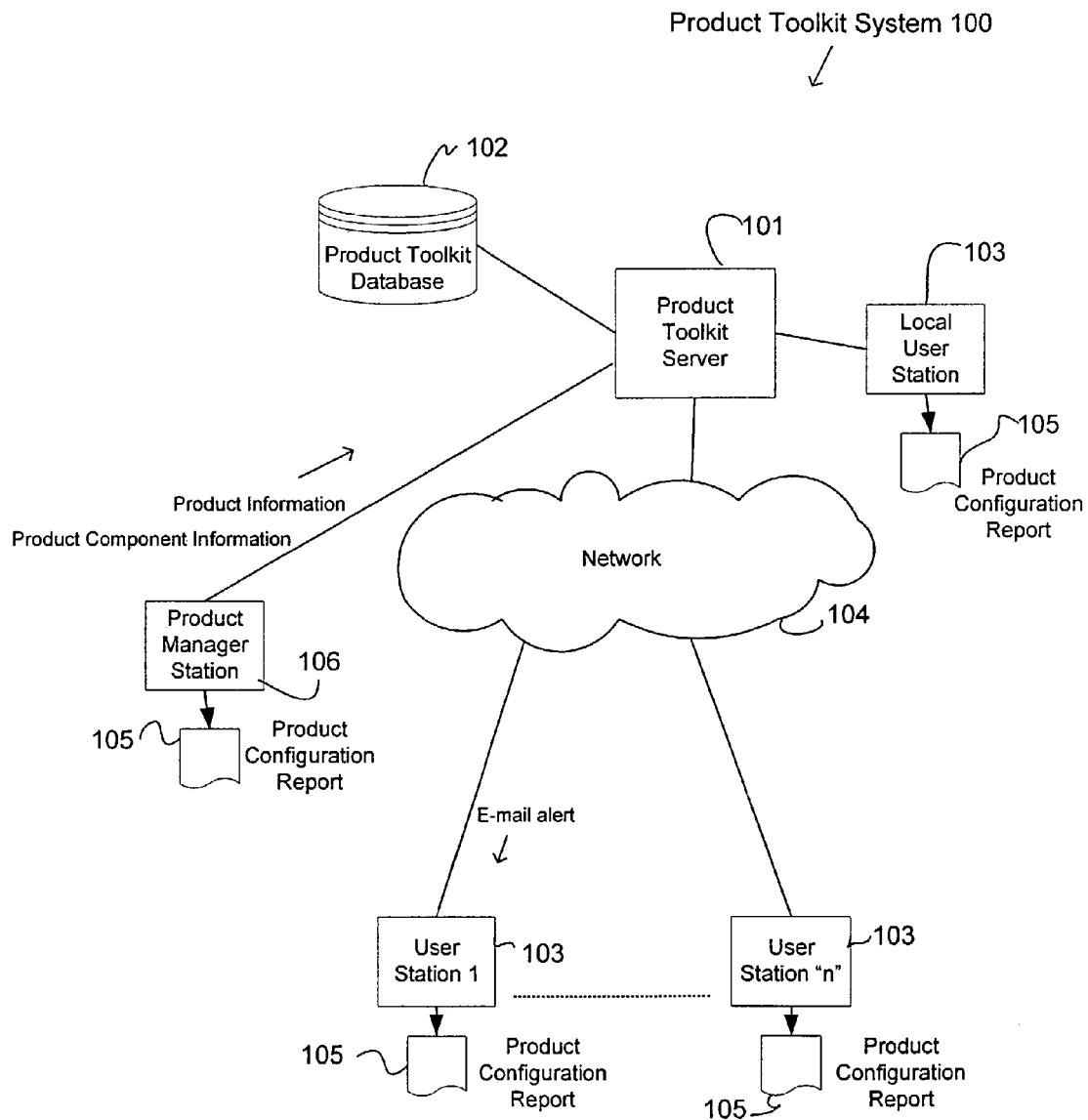
FIG. 1 is an illustrative block diagram of a system implementing or employed by the product toolkit system in accordance with at least one embodiment of the invention.

A functional block diagram of a product toolkit system 100 according to at least one embodiment is shown in FIG. 1. Referring to FIG. 1, the product toolkit system 100 may include a product toolkit server 101, a product toolkit database 102, one or more user stations 103, a network 104 coupling the user stations 103 to the product toolkit server 101, one or more product configuration reports 105, and at least one product manager station 106. The product toolkit server 101 may receive product information and product component information from one or more program manager stations 106. The product toolkit system 100 may maintain and store the received product and product component information using the product toolkit database 102. Product and product toolkit information thus maintained may include information associated with the products and product components supplied by an organization. In at least one embodiment, the product toolkit server 101 may execute a sequence of programmed instructions to cause the product toolkit server 101 to store, select, and arrange the product information and product component information in a manner that facilitates the hierarchical definition (e.g., an n-tier hierarchy) of each product family, category, sales channel and selling geography associated with the sales activity for the organization. The product toolkit server 101 may output the hierarchically arranged product configuration information to a user at a user station 103. In at least one embodiment, product configuration information may be output using one or more product configuration reports 105.

Product components (such as, for example, service at a particular bandwidth, or using particular routers) may be entered and associated with various product offerings for multiple geographies (e.g., product-markets within regional or national boundaries). In addition, the product toolkit system 100 may, in at least one embodiment, permit the identification of all systems/applications utilized by an organization globally. Such identification may include system function, system name, system features, etc. This product information and product component information may be associated, as applicable, with each product offering in an organization's product portfolio. In particular, products, components, systems, and pertinent descriptive information related thereto may be captured and maintained, including, but not limited to, availability status, names of responsible individuals, start and end affectivity dates, product descriptions, and component descriptions. Fully automated audit trail information may also be provided. In at least one embodiment, the product toolkit system 100 may support access security via intranet, the World Wide Web or Internet, or any combination thereof. Full life cycle management information for all products may also be captured. Furthermore, automated workflow processing associated with a product offering may also be provided. In at least one embodiment, there may be multiple views or portals provided for access by a diverse number of user groups. Reporting, both on demand and via schedule, may be included. The product database 102 and product toolkit server 101 applications design may be open to interface with Commercial-Off-The-Shelf (COTS) or custom applications and databases. In at least one embodiment, the product toolkit server 101 may further include an Application Program Interface (API) to facilitate application development and communication with the product toolkit server 101.

The network 104 may be one or more public and/or private networks. In at least one embodiment, the network 104 may be a packet-based messaging network such as, but not limited to, a Transmission Control Protocol/Internet Protocol (TCP/IP) based network. In such embodiments, the TCP/IP based network 104 may be or involve a Local Area Network (LAN), Wide Area Network (WAN), the Internet, or an Intranet, for example, or any combination thereof. All or a portion of the network 104 may be implemented using a variety of transmission media such as, but not limited to, landline, telephone, cable, or wireless link. Furthermore, the network 104 may include transmission security such as, but not limited to, a Secure Socket Layer (SSL). Alternatively, or in addition, encryption may be used to provide transmission privacy and/or source and destination authentication such as a Pretty Good Privacy (PGP) based application, or other public key cryptographic scheme.

Figure 2:
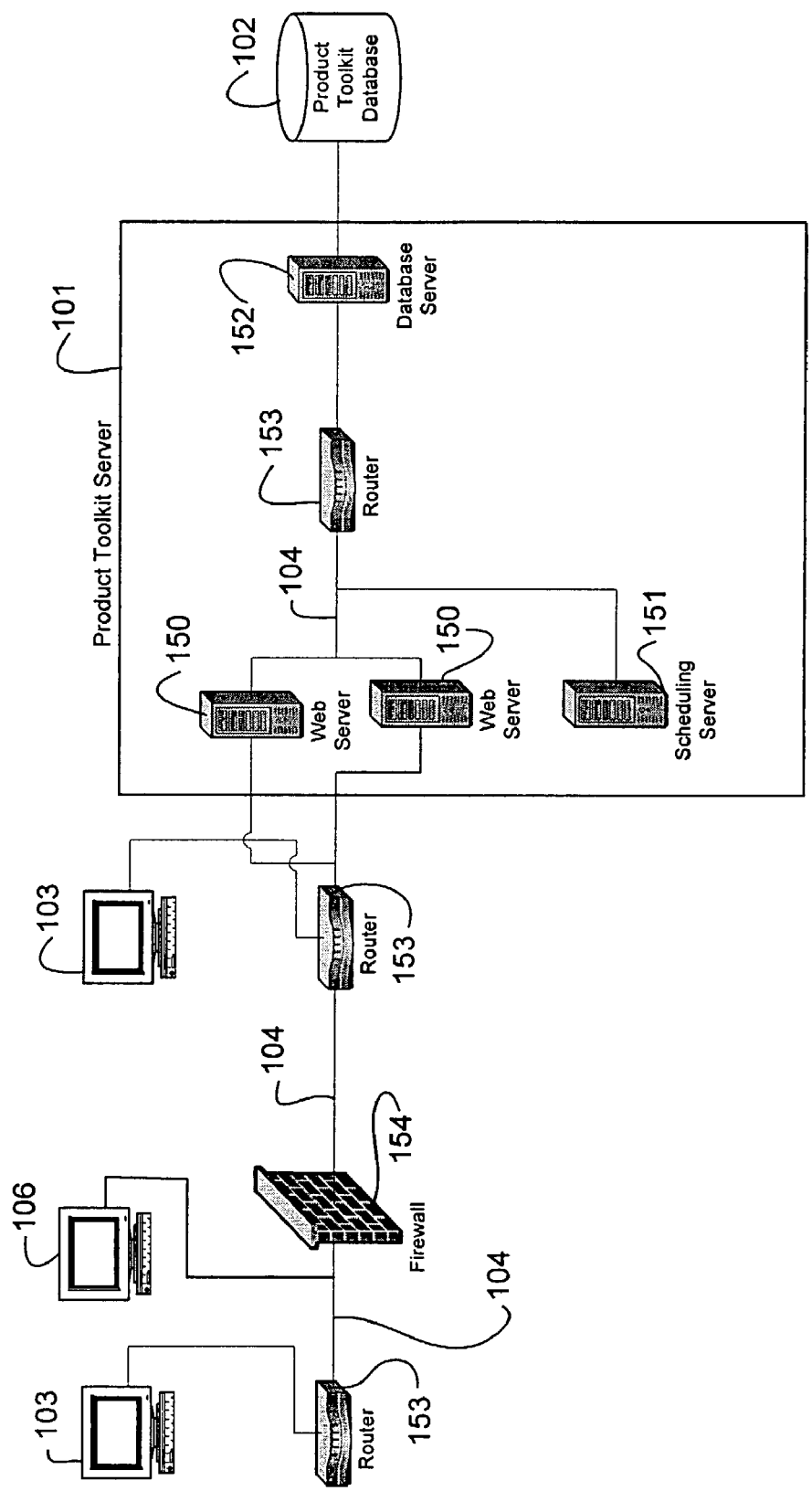
FIG. 2 is a detailed block diagram of the product toolkit system in accordance with at least one embodiment of the invention.

The product toolkit server 101 may, in certain embodiments, actually include one or more servers as shown in FIG. 2. Referring to FIG. 2, in at least one embodiment the product toolkit server 101 may include one or more web servers 150, a scheduling server 151, and a database server 152. In such embodiments, the web servers 150 and scheduling server 151 may communicate with the database server 152 via a router 153 using a network such as the network 104. The database server 152 may be local to or remotely located from the product database 102. The database server 152 may communicate with the product database using an internal computer interface bus or via a network such as the network 104. A web server may serve static content to a World Wide Web browser application by loading a file from a storage location and serving it across the network to a user's Web browser. This exchange may be mediated by the browser and server talking to each other using, for example, the HyperText Transfer Protocol (HTTP).

The product toolkit application 300 may reside on, in at least one embodiment, the web server 150. The web server 150 may run, in an embodiment, Microsoft's IIS™ server and Macromedia's ColdFusion™ Server. In at least one embodiment, the IIS™ server and ColdFusion™ server may be installed and configured on the same server. In at least one embodiment, the product toolkit application 300 may execute on Microsoft® Windows® NT4 SP6. Alternatively, the product toolkit application 300 could be implemented as a sequence of programmed instructions to run under Linux™, Solaris™, or HP-UX, for example. In addition to the web server 150 embodiments discussed above, one or more reports 105 may be implemented in at least one embodiment in interpreted Perl script for execution using, for example, the Active States™ Perl interpreter. In at least one embodiment, the Perl-formatted reports 105 may be scheduled to run once daily, and run from a server separate from the Web Server 150. Alternatively, the Perl, IIS™, and ColdFusion™ could all be installed on the same server. The Perl interpreter may utilize a native connection module to establish TCP/IP connections to the back-end database server 152. However, in at least one embodiment, the Perl code has no dependencies on the web server 150 or any ColdFusion™ code.

In at least one embodiment, the back-end database server 152 may be present at a server separate from the web server 150. The product toolkit database 102 may be an Oracle® Database version 8.1.7.2.0 running on a Sun® server utilizing Solaris™ version 5.6 as its operating system. Connections from the web server 150 to the back-end database server 152 may be made via TCP/IP, and can be accomplished through the ColdFusion™ server engine either via Open Database Connectivity (ODBC) or Native Connections.

User stations 103 and product manager stations 106 may communicate with the web servers 150 via one or more routers 153 using a network such as the network 104, which, as previously described, may be implemented using at least an intranet, the Internet, or a combination thereof. User stations 103 or product manager stations 106 accessing the product toolkit server 101 via a public network such as, but not limited to, the Internet may first be routed to a firewall 154 to prevent unauthorized access to the product toolkit server 101 and the product toolkit system 100. The firewall 154 may include an SSL application to prevent unknown or unauthorized users from gaining access to the product toolkit server 101.

In the at least one embodiment including more than one web server 150, a router 153 may be configured to provide load balancing between or among the multiple web servers 150 to improve uniformity in resource utilization, as a minimum.

The product toolkit server 101 may be implemented, for example, as portions of a suitably programmed general-purpose computer. For example, in reference to FIG. 2, the web servers 150 may each be a personal computer running Microsoft Windows® NT version 4.0 service pack 6 or 6*a* available from Microsoft Corporation of Redmond, Wash., Microsoft Internet Information Services® (IIS) version 4, and ColdFusion® version 4.5 service pack 2 available from the Allaire Corporation of Cambridge, Mass. The scheduling server 151 may also be a personal computer running Microsoft Windows® NT version 4.0 service pack 6 or 6*a*, Microsoft IIS® version 4, and Active State Practical Extraction and Report Language (Perl). The database server 152 may be a personal computer running Sun Solaris® version 5.6 available from Sun Microsystems, Inc. of Santa Clara, Calif. and Oracle® version 8.1.7.2.0 available from Oracle Corporation of Redwood Shores, Calif. Alternatively, the product toolkit server 101 may be a Sun workstation™ available from Sun Microsystems, or any UNIX™-based platform. A detailed description of a computer system 200 that may be used to implement the web server 150, scheduling server 151, or database server 152 is provided with respect to FIG. 3 discussed herein.

Alternatively, the product toolkit server 101 may be implemented, for example, as physically distinct hardware circuits within an Application Specific Integrated Circuit (ASIC). Thus, it should be appreciated that the particular form of the system can be different from that explained herein. Further, in at least one alternative embodiment, the product toolkit server 101 may be a standalone computer platform having its own associated output device such as, but not limited to, a display monitor.

The product toolkit server 101 may execute a server portion of software applications associated with the product toolkit system 100 and make available for download and communicate with a client portion of these applications. The product toolkit server 101 may interact with the product toolkit database 102 for responding to commands and requests received from the user stations 103 and 106. For example, the product toolkit server 101 may build or construct interactive pages for output to a requesting user at a user station 103 using information obtained from the product toolkit database 102 as well as derived or other information supplied by one or more applications executing at the product toolkit server 101.

The product database 102 may provide storage for received product information and product component information. In at least one embodiment, the information stored in or maintained using the product database 102 may be provided in conformance with a database management system format such as, but not limited to, the Structured Query Language (SQL) format. The product toolkit application 300 described herein may be stored using the product database 102. In at least one embodiment, the product database 102 may be, for example, a SQL database provided by the Oracle® Corporation of Redwood Shores, Calif. The product toolkit server 101 or database server 152 may comply with the Java Database Connectivity (JDBC) standard and utilize thin type-4 drivers to communicate with the product database 102 to access stored product information and product component information. In alternative embodiments, the product database 102 may be implemented in accordance with the DB2 database product standard available from IBM® Corporation. Furthermore, alternatively, the product toolkit database 102 may be a SQL Server 7.0 database supporting the ActiveX Data Object (ADO) and ODBC protocols provided by IBM® Corporation or Sybase® Corporation. The product database 102 may further include information such as, but not limited to, database query and access instructions in the form of one or more scripts which, when executed by a processor, serve to store and retrieve data maintained using the product database 102 according to the instructions contained in the script, and in particular regarding the data fields to be accessed, as well as their arrangement, provided in the response to the processor.

In at least one embodiment, the product manager station 106 may transmit to the product toolkit server 101 product information and/or product component information associated with the particular products or components. Upon receiving the product and/or component information, the product toolkit server 101 may store the information for later processing. In at least one embodiment, the product toolkit server 101 may store received product and component information using the product toolkit database 102.

The user station 103 and product manager station 106 may be implemented using a personal computing device having a browser, such as a web browser application. Alternatively, the user station 103 and product manager station 106 may be implemented using a wireless terminal such as a personal digital assistant, a cellular or portable telephone terminal, or an Internet appliance, configured for electronic or optical communication with the product toolkit server 101. An Internet appliance may be, for example, a computer with minimal memory, disk storage and processing power designed to connect to a network, especially the Internet. Although FIG. 1 shows two user stations 103 and one product manager station 106, it is to be understood that the product toolkit system 100 may support any number of such stations 103 or 106, including as few as one station. The user stations 103 and product manager stations 106 may be collocated with the product toolkit server 101, or located remotely from the product toolkit server 101 and coupled to the product toolkit server 101 using the network 104, as shown in FIG. 1. Access to the product toolkit application 300 and the back-end database (e.g., product toolkit database 102) may require that the user station 103 and product manager station 106 have a web browser such as, for example, Microsoft® Internet Explorer™ 5.0 or higher.

Figure 3:
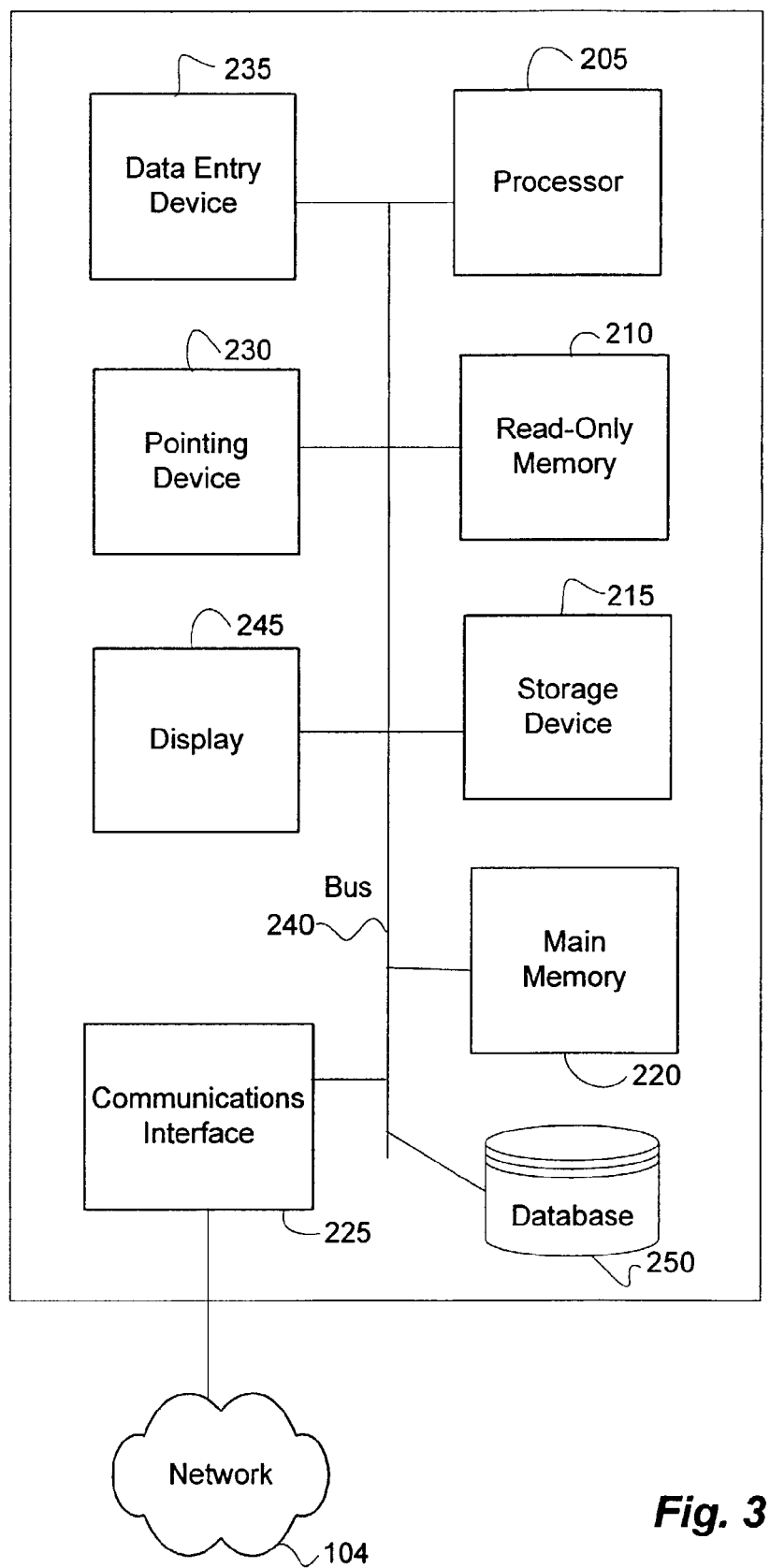
FIG. 3 is a functional block diagram of a computer system which may be used to provide a computing platform for portions of the product toolkit in at least one embodiment of the invention.

FIG. 3 is a block diagram of a computer system 200 that may be used in some embodiments to implement the computing platform for the product toolkit server 101, user station 103, product manager station 106, web server 150, scheduling server 151, or database server 152. The computing system 200 may be implemented as or include one or more personal computers, workstations, handheld personal data assistants, Internet appliances (e.g., a computer with minimal memory, disk storage and processing power designed to connect to a network, especially the Internet), or controllers. The computer system 200 may include a bus 240 or other communication mechanism for communicating information, and a processor 205 coupled with the bus 240 for processing information. The computer system 200 also may include a main memory 220, such as a Random Access Memory (RAM) or other dynamic storage device, coupled to the bus 240 for storing information and instructions to be executed by the processor 205. The main memory 220 also may be used for storing temporary variable or other intermediate information during execution of instructions to be executed by the processor 205. The computer system 200 further may include a Read-Only Memory (ROM) 210 or other static storage device coupled to the bus 240 for storing static information and instructions for the processor 205. A storage device 215, such as a magnetic disk or optical disk, may be provided and coupled to the bus 240 for storing information and instructions.

The processor 205 may fetch the instructions, decode them, and act or instruct other elements 210-250 to, for example, transfer data to or from the memory 220 or to work in combination with the data entry device 235 or the display 245 (for example, to input or output data), etc. The processor 205 may actually be implemented as more than one processor. It should be appreciated that the processor 205 may be implemented as a general purpose microprocessor, for example, in a central processing unit, a microcontroller, or other similar device.

In at least one embodiment, a database 250 may be coupled to the bus 240 for storing static information and software instructions. Information stored in or maintained using the database 250 may be provided in conformance with a database management system format such as, but not limited to, the SQL format. The database 250 may be a SQL database provided by the Oracle® Corporation of Redwood Shores, Calif. Alternatively, the database 250 may be a SQL Server 7.0 database supporting the ADO and ODBC protocols provided by IBM® Corporation or Sybase® Corporation. The database 250 may include information including, but not limited to, database query and access instructions in the form of one or more scripts which, when executed by a processor such as the processor 205, serve to store and retrieve data maintained using the database 250 according to the instructions contained in the script, and in particular regarding the data fields to be accessed, as well as their arrangement, provided in the response to the processor 205. In at least one embodiment, the product database 102 may be implemented using the database 250.

According to at least one embodiment of the present invention, aspects of the product toolkit system 100 as described herein may be provided by the computer system 200 in response to the processor 205 executing one or more sequences of instructions contained in the main memory 220. Such instructions may be read into the main memory 220 from another computer-readable medium, such as the storage device 215 or the database 250. Execution of the sequences of instructions contained in the main memory 220 may cause the processor 205 to perform the process steps described herein. One or more processors in a multi-processing arrangement may also be employed to execute the sequences of instructions contained in the main memory 220. Alternatively, hardwired circuitry may be used in place of or in combination with software instructions to implement the invention. Thus, embodiments of the invention are not limited to any specific combination of hardware circuitry and software.

The computer system 200 may be coupled via the bus 240 to a display 245 for outputting information to a computer user. In one embodiment, the display 245 may be a Cathode Ray Tube (CRT) computer display monitor capable of displaying information using multiple colors. Alternatively, the display 245 may be a liquid crystal display, a monochrome monitor, a web-enabled wireless terminal or handheld terminal such as, for example, a Personal Digital Assistant (PDA). The computer system 200 may include other output devices as well such as, but not limited to, a printer.

A data entry device 235, including alphanumeric and other keys, may be coupled to the bus 240 for communicating information and command selections to the processor 205. Another type of user input device which may be coupled to the bus 240 is a pointing device 230, which may be a computer mouse, trackball, cursor direction keypad, tactile directional fingerpad, or other such device for allowing a user to control cursor location and movement on the display 245, and for communicating direction information and command selections to the processor 205. This pointing device 230 typically has two degrees of freedom in two axes, a first axis (e.g., x) and a second axis (e.g., y), that allows the pointing device to specify positions in a plane.

The term "computer-readable medium" as used herein refers to any medium that participates in providing instructions to the processor 205 for execution. Such a medium may take many forms, including, but not limited to, non-volatile media, volatile media, and transmission media. Non-volatile media include, for example, optical or magnetic disks, such as the storage device 215. Volatile media include dynamic memory, such as the main memory 220. Transmission media can also take the form of acoustic or light waves, such as those generated during Radio Frequency (RF) and InfraRed (IR) communications. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, a carrier wave as described hereinafter, or any other medium from which a computer can read.

Various forms of computer-readable media may be involved in carrying a sequence of one or more instructions to the processor 205 for execution. For example, the instructions may initially be borne on a magnetic disk of a remote computer. The remote computer may load the instruction into its dynamic memory and send the instructions over a telephone line using a modem. A modem local to the computer system 200 may receive the data on the telephone line and use an infrared transmitter to convert the data to an infrared signal and place the data on the bus 240. The bus 240 may carry the data to the main memory 220, from which the processor 205 retrieves and executes the instructions. The instructions received by the main memory 220 may optionally be stored on the storage device 215 either before or after execution by the processor 205.

The computer system 200 may also include a communication interface 225 coupled to the bus 240. The communication interface 225 may provide a two-way data communication coupling to the network 104. For example, the communication interface 225 may be a modem or an Integrated Services Digital Network (ISDN) card to provide a data communication connection to a corresponding type of telephone line. As another example, the communication interface 225 may be a LAN card to provide a data communication connection to a compatible LAN. Wireless links may also be implemented. In any such implementation, the communication interface 225 sends and receives electrical, electromagnetic, or optical signals that carry digital data streams representing various types of information.

The communication interface 225 may provide data communication through one or more networks to other data devices. For example, the communication interface 225 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams. These signals are exemplary forms of carrier waves transporting the information.

The communications interface 225 may include Ethernet interface or a LAN communication card, a dial-up modem interface using the PSTN, an intranet, or any combination thereof.

The computer system 200 may send messages and receive data, including program codes, through the network(s) and the communication interface 225. In the Internet example, a server might transmit a requested code for an application program through the Internet, ISP, and the communication interface 225. One such downloaded application may, for example, provide for product information and product component information management as described herein. The received code may be executed by the processor 205 as it is received, and/or stored in the storage device 215, or other non-volatile storage for later execution. In this manner, the computer system 200 may obtain an application code in the form of a carrier wave.

The product toolkit server 101 may receive commands and data from the user station 103 or product manager station 106 and output program code and data to the user station 103 or product manager station 106 using the network 104. In an embodiment, the product toolkit server 101 may generate and transmit the requested information to the requesting user via Hypertext Transfer Markup Language (HTML) formatted or eXtensible Markup Language (XML) formatted pages, which may be provided as World Wide Web pages, using the network 104. As described previously, the network 104 may be, for example, a network of interconnected networks such as the Internet, a LAN, a WAN, an intranet including any of these, and/or the PSTN. Interactive pages transmitted and received using the network 104 may conform to the SSL protocol.

The communications interface 225 may further include a web browser or a so-called thin client. A thin client may be a client portion of an application designed to require little memory so that the bulk of the data processing occurs on a corresponding server. In at least one embodiment, a thin client may be Java-based. The web browser displays data and is capable of communicating with other computers via a network such as, for example, the Internet or an intranet. The web browser provides a user with a way to navigate, via, for example, hyperlinks which are selected by the pointing device 230 such as a computer mouse, or as typed in by the user. The web browser uses a protocol such as, for example, HTTP or File Transfer Protocol (FTP), to transmit data of various content such as, for example, HTML formatted documents, plain text documents, graphic images, and XML documents for presentation to the user via the display 245. Web pages formatted in accordance with HTML or XML may also be provided in accordance with the eXtensible Style Language (XSL) specification available from the World Wide Web Consortium. XSL is useful for separating style from content as well as for providing a common interface for sharing of web pages across applications. The web browser may also run or execute programs, such as Java applets including sequences of instructions provided in accordance with the Java programming language, or JavaScript. The web browser may be, for example, Internet Explorer® version 5.0 or higher by Microsoft® Corporation, Netscape Navigator® by Netscape®, America Online® browser, or any other web browser. A thin client may utilize a two or more tiered client server model. In this model, the may client run a minimal set of services that provide functionality to interface with at least one server. A web browser may be a thin client. The product toolkit server 101 may run, for example, the Windows® NT network operating system available from Microsoft® Corporation of Redmond, Wash.

Instructions executed by the processor 205 from the main memory 220 may include, for example, application software instructions that cause the processor 205 to perform operations as described herein. These application instructions may be implemented in the form of source code statements provided in accordance with, for example, the Visual C++® and Visual Basic® higher order programming languages, development kits for which are available from Microsoft® Corporation. Application instructions may also include database scripts for accessing, storing, or selectively retrieving information contained in the database 250 or the product database 102. The database scripts may be contained in the storage device 215 or may be stored using the database 250 or the product database 102. The database scripts may be implemented in the form of programming statements provided in accordance with, for example, SQL version 7.0 database management system query language, as well as the IBM DB2® system. Other database implementations are possible, including those available from Oracle® or Transact SQL in accordance with the ColdFusion® database management system.

Application software instructions may include a user interface portion, which may be a graphical user interface (GUI) portion, for generating interactive pages or display screens by which a user may provide data to and receive information from the computer system 200 and the database 250 or the product database 102 using a human-machine interface such as, but not limited to, the display 245. Interactive pages may include user dialog boxes for accepting user entered information. In particular, the GUI portion may prompt the user to enter data by providing an interactive dialog box or message box instructing the user to enter particular data, or to select from among a multitude of options provided using a pull-down menu. The human-machine interface may also include a hardcopy generating device such as a printer. A user may interact with the computer system 200 via the graphical user interface provided by the GUI portion by using the pointing device 230 and the data entry device 235. The GUI portion may place the output of the computer system 200 in a format for presentation to a user via the display 245. In at least one embodiment, the GUI may be implemented, for example, as a sequence of Java Swing® instructions. Java Swing® is part of the Java™ Foundation Classes (JFC) in the Java™ platform. The JFC encompasses a group of features to aid in the development of GUIs. Swing® provides all the components from buttons to split panes and tables. The Java™ classes and logic of the GUI may be implemented in Java™.

In particular, a user may select a particular data entry field of an interactive display page presented using the display 245 by using the pointing device 230 or the data entry device 235 to select that field. Upon selecting a field, a user may then enter information into the data entry field using the data entry device 235. After the user has entered data into the data entry field, the user may cause the GUI portion to input the user-entered information to the computer system 200 using the pointing device 230 to select a corresponding display icon or command button.

Thus, the user station 103 and product manager station 106 may send messages and receive data, including program codes, through the network(s) 104 and the communications interface 225 (reference FIG. 1). In at least one embodiment, the user station 103 and product manager station 106 might transmit a requested code for an application program through the Internet, ISP, and/or the communication interface. In accordance with at least one embodiment, one such downloaded application provides for user interaction with the product toolkit system 100 using the interactive displays or interactive pages described herein. The received code may be executed by the processor 205 as it is received, and/or stored in a non-volatile storage device for later execution. In this manner, computer system 200 may obtain an application code in the form of a carrier wave.

The product toolkit server 101 may receive commands and data from the user station 103 and product manager station 106 and output program code and data to the user station 103 and product manager station 106 using the network 104. In at least one embodiment, the product toolkit server 101 may generate and transmit the requested data to the requesting user station 103 or product manager station 106 via HTML formatted or XML formatted pages, which may be provided as World Wide Web pages, using the network 104. The network 104 may be, for example, a network of interconnected networks such as the Internet, a LAN, a WAN, an intranet including any of these, and/or a PSTN. The communications interface 225 may further include a web browser or thin client. A thin client is a client portion of an application designed to require little memory so that the bulk of the data processing occurs on a corresponding server. In at least one embodiment, a thin client may be Java-based. The web browser may be configured to display data and communicate with other computers via a network such as, for example, the Internet or an intranet. The web browser may provide a user with a way to navigate, via, for example, hyperlinks which may be selected by the pointing device (such as a computer mouse), or as typed in by the user. The web browser uses a protocol such as, for example, HyperText Transfer Protocol (HTTP) or File Transfer Protocol (FTP), to transmit data of various content such as, for example, HTML formatted documents, plain text documents, graphic images, and XML documents for output presentation to the user via the display.

The product toolkit server 101 may include a sequence of programmed instructions, which, upon execution, are operable to configure the computer system 200 to carry out the product toolkit functions described herein. These software instructions may be implemented using, for example, Javascript® instructions. Other implementations are possible using, for example, the C++, Visual Basic™, or Javascript® programming languages, or any combination thereof. The product toolkit server 101 may thereby be configured, using a sequence of programming instructions, for example, to capture, arrange, and configure product information and product component information for the products and components supplied by an organization.

Figure 4:
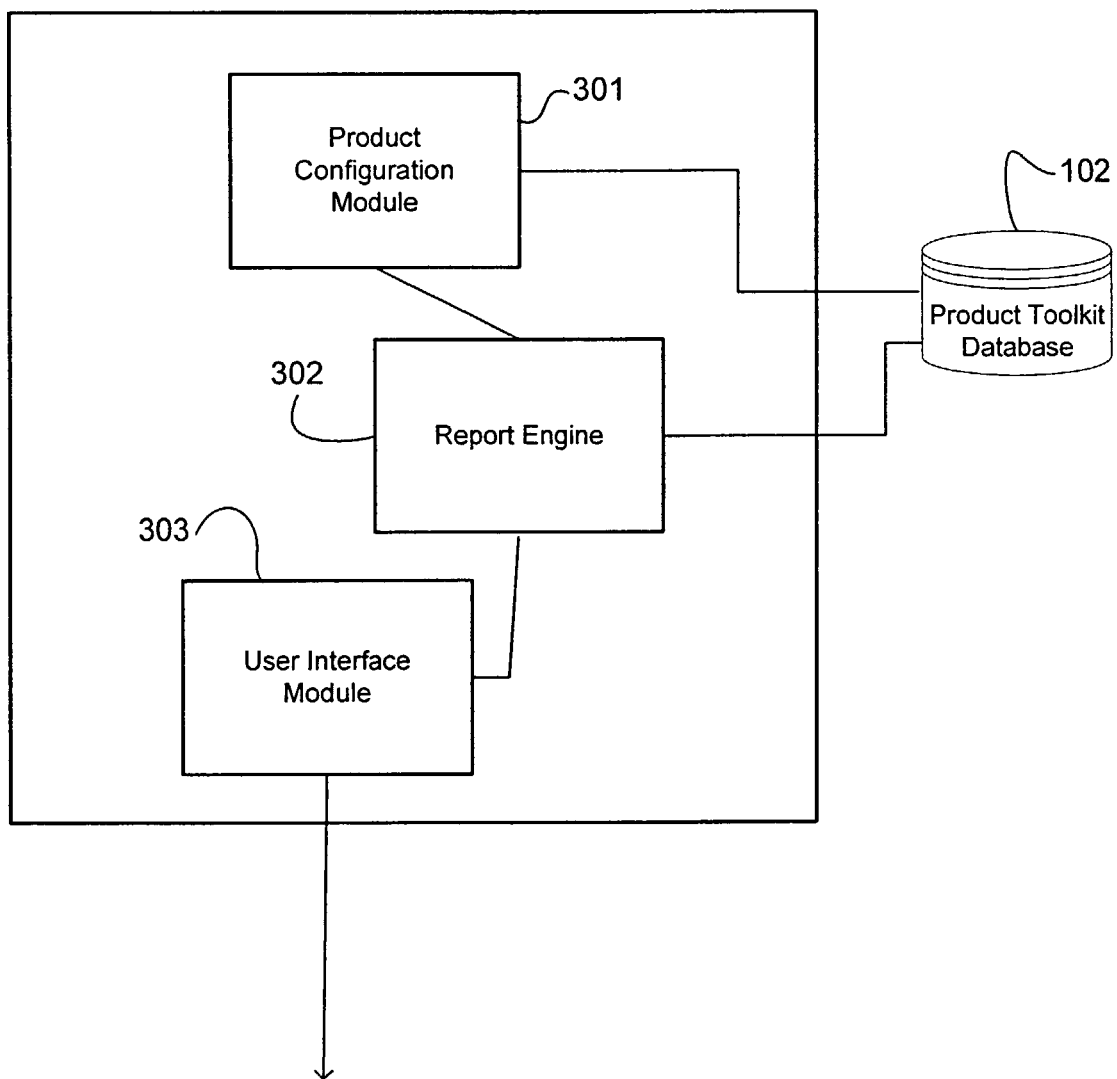
FIG. 4 is a functional block diagram of a product toolkit application associated with at least one embodiment of the invention.

Referring to FIG. 4, the product toolkit application 300 may, in accordance with at least one embodiment, provide a single software application for the identification and management of all product information and product component information of an organization. A product toolkit application 300 may include a product configuration module 301, a report engine 302, and a user interface module 303. The product configuration module 301, report engine 302, and user interface module 303 may also include sequences of database access scripts to effect storage and retrieval of product and component information using the product database 102. These database access scripts may be implemented in the form of SQL scripts. The product toolkit application 300 may further include an Applications Programming Interface (API) (not shown) that provides a set of predefined function parameters and communication standards to facilitate use of the product toolkit server 101 and its integration with other software applications.

The product toolkit application 300 may include a report engine 302 that allows the user to define report content, level of detail, format, and output destination (on-line, printer, email, file download). This dynamic capability reduces the need for customized report coding and the need to engage an IT organization for support.

Figure 5:
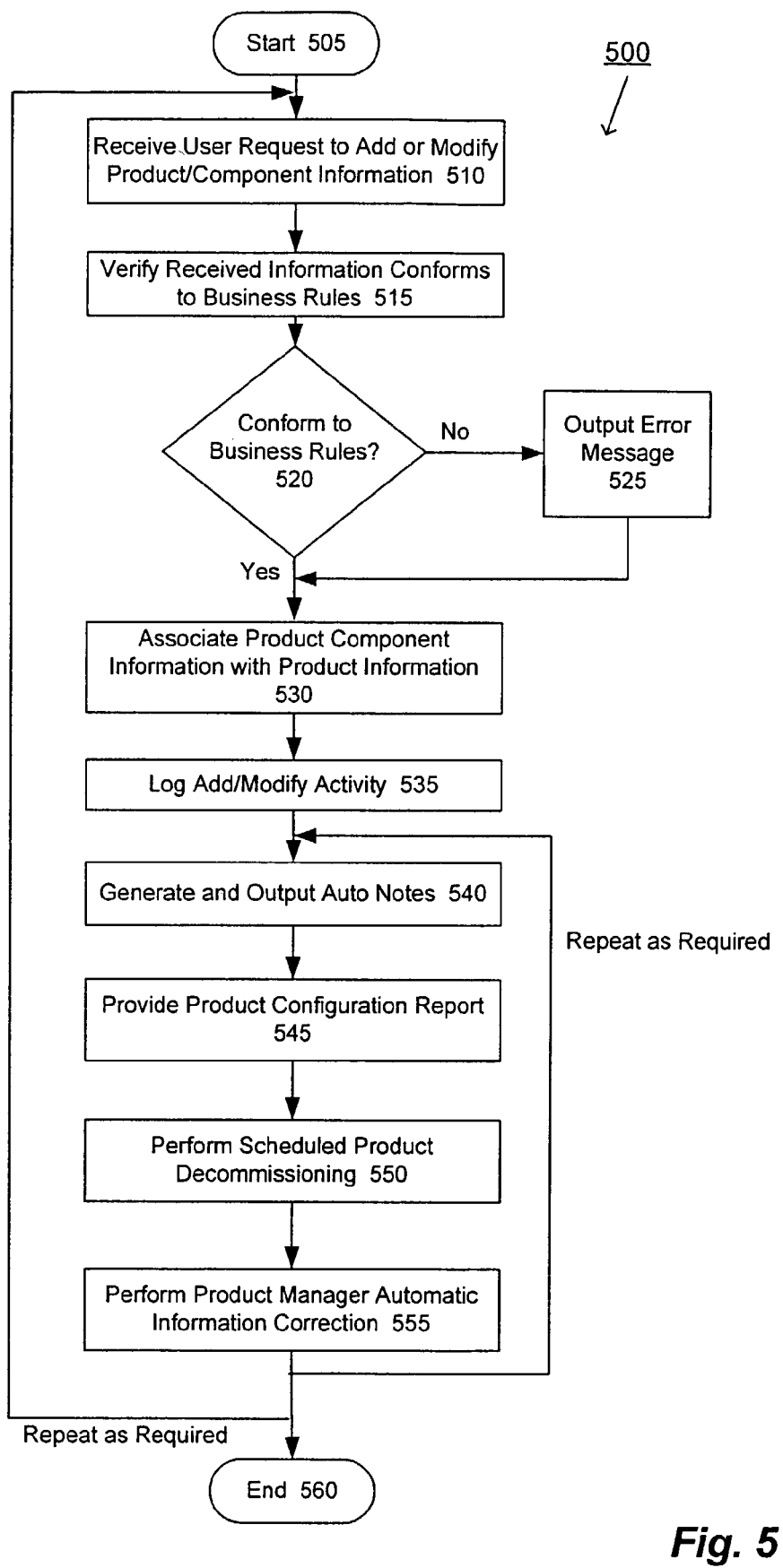
FIG. 5 is a flow chart illustrating a product toolkit method according to at least one embodiment of the invention.

The product configuration module 301, acting in cooperation with the user interface module 303, may permit a supervisory user to add or modify product, component and system entities in the form of product information or product component information, as well as allow supervisory users and other users access to that information, according to an exemplary method 500 as shown in FIG. 5. Referring to FIG. 5, such a method 500 may commence at 505. Control may proceed to 510, where the user interface module 303 may receive a request to add or modify product information or product component information. This request may be received by the user interface module 303 at the product toolkit server 101 from the product manager station 106 via the network 104 in the form of an HTML formatted interactive page including the new or modified product information or product component information, for example.

In at least one embodiment, more than one access level may be supported for the product toolkit system 100. Activity may be limited based on the user's level of access and information type for the product information of product component information sought to be added or modified. In particular, supervisory users may have permission to add or modify product information or product component information maintained by the product toolkit system 100 using, for example, the product toolkit database 102. In at least one embodiment, the product toolkit database 102 may maintain each set of product information according to varying levels of access (read/write) per set in order to provide the capability for the configuration of products, definition of reporting geography regions, user access, etc. by a group of "super users," or supervisory users, via the product configuration module 301. This greatly reduces the need to engage an IT organization for on-going support and/or code changes, for example. Supervisory users may access the product toolkit system 100 using, typically, the product manager station 106. Other users may view information such as product configuration reports 105, but do not have permission to add or modify product information or product component information. Such view-only users may access the product toolkit system 100 using, for example, the user station 103.

Returning to FIG. 5, upon receiving a supervisory user request to add or modify product information or product component information via the user interface module 303, the user interface module 303 may provide the received information the product configuration module 301. Control may then proceed to 515, at which the product configuration module may verify that the product information and product component information for each product or component are unique and meet all business rules/restrictions. This may be accomplished by, for example, transmitting a database query to the product toolkit database 102 to elicit any pre-existing stored product information or product component information as well as the applicable set of business rules/restrictions maintained using the product toolkit database 102, and then the stored product information and product configuration information from the product toolkit database 102. In at least one embodiment, the product configuration module 301 may also perform data integrity checking based on, for example, known or acceptable ranges of values for various portions of product information and product component information.

Control may then proceed to 520, at which the product configuration module 301 may compare the stored product information and product configuration information received from the product toolkit database 102 to the added or modified product information or product component information requested by the supervisory user. If the information is unique (i.e., not duplicate information) and satisfies the business rules/restrictions, then control may proceed to 530. If not, then control may proceed to 525 for generation and output of an error message to the requesting supervisory user. In at least one embodiment, the error message may be provided in the form of a popup text box transmitted from the product toolkit server 101 to the product manager station 106 via the network 104 in accordance with the HTML standard.

At 530, the product configuration module may associate the added or modified product information and product component information with one or more product entities or objects indicated by the product toolkit database 102, or as indicated in the request itself, as including that product component. The product configuration module 301 may associate the new or modified information with the one or more product entities by causing a corresponding database storage command to be executed to cause the information to be tagged or linked as such in the product toolkit database 102. This may be accomplished using a corresponding SQL instruction or sequence of instructions.

Control may then proceed to 535, at which the product configuration module 301 may log the update activity such as, for example, when and by whom additions or modifications were made, in tracking database tables maintained for this purpose using the product toolkit database 102.

Control may then proceed to 540, at which the product configuration module 301 may generate and output "auto notes" based on business rules. In at least one embodiment, the "auto notes" may be one or more electronic mail alerting messages transmitted from the product toolkit server 101 to one or more user stations 103 and product manager stations 106 via the network 104 in accordance with, for example, the SMTP protocol. These alerting messages may provide, as a minimum, a notification that product information or product component information associated with a product object has been added or modified. In at least one embodiment, an alerting message may be transmitted by the product toolkit server 101 to each user station 103 and product manager station 106 identified as being associated with users having an interest in the affected product objects, as indicated in the product toolkit database 102.

Control may then proceed to 545, at which the product toolkit application may provide one or more product configuration reports 105 to a requesting user. A view only user or a supervisory user may access the product toolkit system 100 to view product information and product component information maintained by the product toolkit system 100 according to a variety of views using, for example, product configuration reports 105. The product configuration module 301 may provide the capability for a user to view product toolkit system 100 information based on the user's access level and information type, per the business rules and tables maintained using the product toolkit database 102. The product configuration reports 105 may be generated and provided according to a variety of output means including, but not limited to, online using HTML-formatted reports, routing to a local or network printer, routing using one or more email messages in accordance with, for example, the SMTP protocol, or extracting into a Microsoft® Excel™ format for download to a user station 103 or product manager station 106.

Prior to outputting a product configuration report 105 to a requesting user or supervisory user, the report engine 302 may first verify that the requesting user (who may be or have been a product manager in the organization) is still employed by the organization and continues to have access to the requested product toolkit system 100 information. The report engine 302 may transmit an employee information request to an external employee records database (not shown) of the organization in order to obtain this information. The employee records database may maintain such employee records as, for example, SQL-formatted information similarly to the product toolkit database 102. The report engine 302 may be coupled to the employee records database using a network such as the network 104. Based on the entitlement information obtained from the employee records database, the report engine 302 may grant or deny further access to the requested product configuration report 105.

Furthermore, control may also proceed to 550, at which the product configuration module 301 may perform automated/scheduled system maintenance for physical deletes (database maintenance). For example, the product configuration module 301 may perform daily scheduled process to identify any components that are nearing (90-day, 60-day, 30-day, "today") expiration. When a component is identified, automated emails may be sent to the component owner as well as to any/all product managers which have used/associated this component in their product(s) definition. Components which are identified as expiration date="today" may be modified in the product toolkit database 102 to reflect an appropriate status indicator. Audit fields may also be automatically updated.

In addition, control may also proceed to 555, at which the product configuration module 301 may also perform scheduled comparison and automated data correction for product manager information using another database that maintains organization personnel information. The product toolkit system 100 may thereby maintain product manager contact information (e.g., product ownership information and access permission) in synchronization with the organization's personnel database.

Control may then proceed to 560, at which a method 500 may end.

The user interface module 303 may include a sequence of programmed instructions for receiving user requests and input and for generating interactive output pages. The user interface module 303 may include a GUI portion. The GUI portion may generate interactive pages or display screens by which a user may provide data to and receive data from the computer system 200 using a human-machine interface such as, but not limited to, a display. Interactive pages may include user dialog boxes for accepting user entered data. The human-machine interface may also include a hardcopy generating device such as a printer. A user may interact with the computer system 200 via the graphical user interface provided by the GUI portion by using the pointing device and the data entry device. The GUI portion may place the output of the computer system 200 in a format for presentation to a user via the display. User input may be received by the user interface module 303 of the product toolkit application 300 as data entered into a data entry field of an interactive page, such as, but not limited to, a browser page or a world wide web page. User input from the pages may provide requests for product configuration reports 105 from, or requests to add or modify product information or product component information to, the product toolkit system 100. The user interface module 303 may output Windows® formatted display pages or interactive pages such as, for example, browser formatted pages or world wide web pages. The output interactive pages may provide to the user the requested product information or product component information using, for example, one or more product configuration reports 105.

Through the modular organization of product information and product component information, the product toolkit system 100 provides the capability for an organization to instill disciplined product management policies and procedures, including adherence to a framework for product life cycle management. Furthermore, the product information maintained by the product toolkit database 102 may include contact and/or interface information for the sales, ordering, provisioning, and billing capabilities or platforms of an organization having responsibility for a given product, thereby providing an extended product definition.

In at least one embodiment, the product toolkit system 100 may define product entities or objects in a global product hierarchy by setting and maintaining, for example, database objects and attributes establishing a hierarchical relationship using the product toolkit database 102. These product entities or objects may be bundled into different combinations using one or more of the variously available product components within a product definition in to specify multiple saleable products of the organization. Product components may represent items and services that are sold individually by the organization. For each product entity or object, multiple product components may be indicated as being available for bundling with one or more of the product entities or objects by, for example, associating this product component information with each of the product entities or objects using the product toolkit database 102. The product information may include identification of the functional areas and systems of the organization having responsibility for sales and service for the product.

Figure 6:
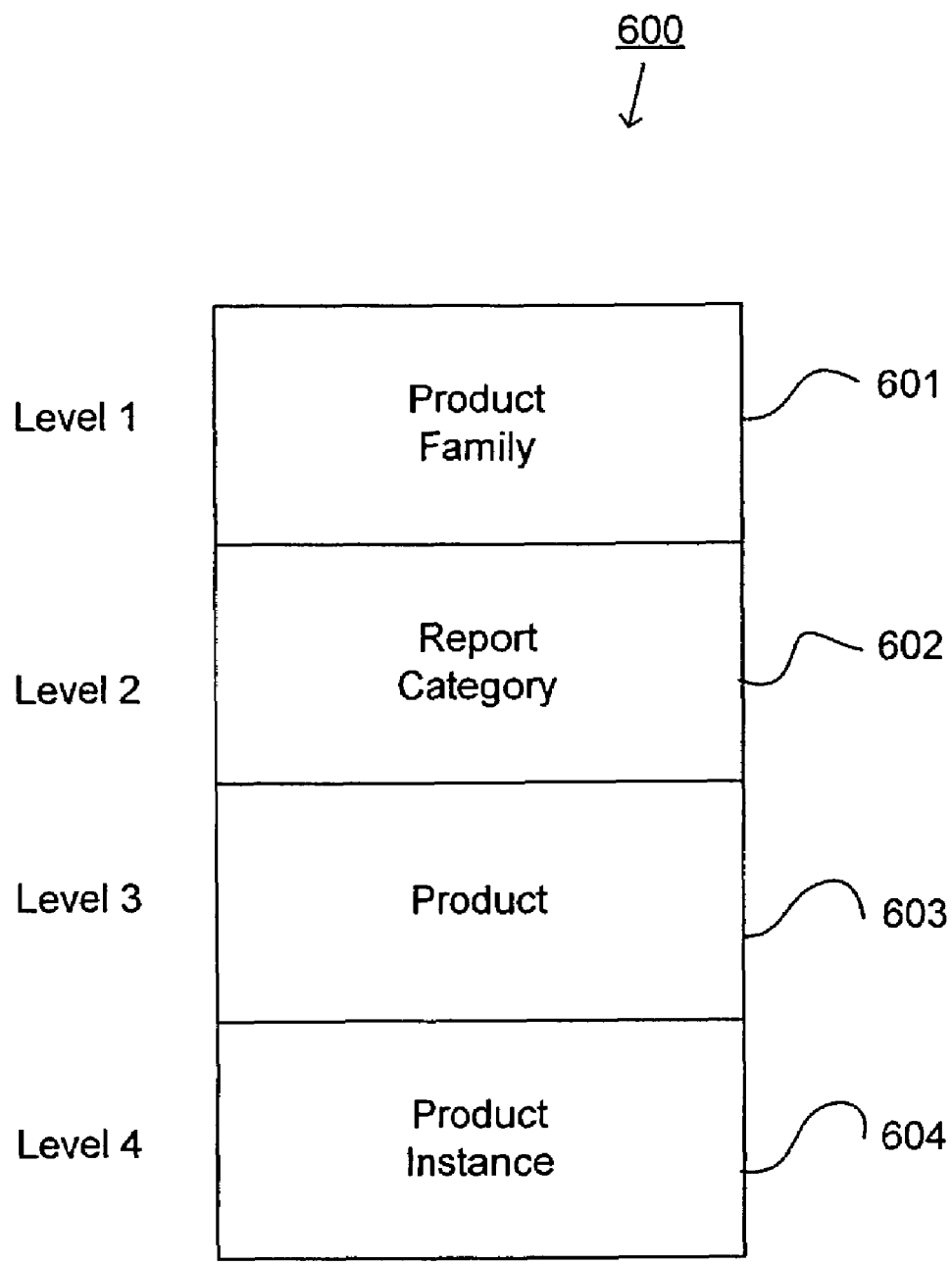
FIG. 6 illustrates multiple levels of a global product hierarchy according to at least one embodiment of the invention.

The global product hierarchy provided by at least one embodiment of the product toolkit system 100 may include multiple levels as shown in FIG. 6, for example. Referring to FIG. 6, in at least one embodiment, the global product hierarchy may include four levels: 1) the Product Family level 601 may represent the highest level of product grouping; 2) the Report Category level 602 may represent the second level; 3) the Product level 603 may represent a third level; and the Product Instance level 604 may represent a fourth level. There may be multiple Report Categories within a Product Family. There may be multiple Products within a Report Category. Finally, there may be multiple Product Instances within a Product. At the Product Instance level 604, various Product Instances may be defined by differing values of functional areas and systems which, when combined variously, serve to define different product/service combinations (i.e., different Product Instances). The functional areas and systems may include, but are not limited to, sales channels, selling geography, versions, provisioning levels, and Service Level Agreements (SLAs).

As an example, a Product Family may be the "IP Solutions" group of products. Within the "IP Solutions" Product Family level 601, one of the Reporting Categories may be "Network Security." Products within the "Network Security" Reporting Category level 602 may include a "Managed Firewall" product, a "PKI Remote Access Product," and a "PKI Secure Mail" product. Taking the "Managed Firewall" product at the Product level 603, for example, a particular Product Instance may be the "Managed Firewall" product sold through "Retailer XYZ" within the states of Arizona and New Mexico. It can be seen that other Product Instances may be defined by selecting a different sales channel or a different selling geography. As noted above, other functional areas or systems may be selected to define still further different Product Instances for the "Managed Firewall" product, such as, but not limited to, differing service plans, differing provisioning procedures or rates, and differing price plans, to name but a few.

Versioning may be used to define multiple Product Instances (e.g., same Sales Channel and Selling Geography) if needed for selling duration, or other variances. For example: "Product A," sold by "Enterprise X" in the UK, may have a Version 1, to sell from 1 Jan. 1999-1 May 2002, and also a Version 2, to sell from 2 May 2002-"always." As another example, within the "IP Solutions" Product Family, "Network Security" Reporting Category, and "Managed Firewall" product, each of the following may define a different Product Instance:

Product Instance 1: Business Markets, UK, version 1
Product Instance 2: Enterprise Markets, US, version 1
Product Instance 3: Enterprise Markets, US, version 2
Product Instance 4: Enterprise Markets, Germany, version 1
Product Instance 5: Business Markets, Belgium, version 1

In addition to the hierarchical definition of products as described above, each product and product instance may be further identified and governed by a combination of life cycle stage and status. Depending upon a given stage and status, a product may be modified, cloned, decommissioned, or provisioned for sale (i.e., Launched). In at least one embodiment, automated workflow and user permissions may be governed by this information, per Product Instance. Life cycle stages may include, but are not limited to: Database Entry Mode, Proposal, Initial Investigation Gate, Feasibility Gate, Development Gate, Launch, Decommissioning Gate, and Product Closure. Status values associated with each life cycle stage may include, for example: On Hold and Sell as Normal. The life cycle stage and status information may also be included in the product toolkit database 102.

By way of simplification, Product Families, Reporting Categories, and Products may be used to define the products available for sale by an organization. By further attaching specific information for Sales Channels, Selling Geographies, and Versions, the product toolkit system 100 may define how and where the products are sold. A supervisory user such as a Product Manager may establish particular Product Instances to define the overall product/service mix to be sold to a particular customer or group of customers.

In at least one embodiment, product components may include all items or services offered by an organization (and, if applicable its channel partners). The items or services may be stored and maintained in the form of product component information contained in or linked to a single database such as, for example, the product toolkit database 102. Components may be defined once, regardless of the number of products, geographies, and sales channels that may offer them. Components can be defined to an n-level of detail, as appropriate, in order to capture all relevant product or service distinctions. Components can be stand-alone or bundled, and can be related to other components. Product component information may be associated with any number of Product Instances in the product toolkit database 102. An example of a component for an ATM access product may be, for example, a 4 MBps connection as a first component included in a product instance, and a 16 MBps connection as a second component included in a different product instance. By capturing all the items and services that an organization sells, the product toolkit system 100 may provide a virtual warehouse or catalogue of items in a single database. Components may be defined as stand-alone or bundled, and to any level of detail necessary to capture all appropriate variables within any item or service. Once defined, a single component or package can be re-used any number of times through association to multiple Product Instances.

Functional areas and systems, described briefly above, may be further described as follows. Functional areas may include groups or types of business systems used to enable a product. Examples of functional areas and systems include, without limitation, bill and collect, order and provide, and Customer Relationship Management (CRM). An organization's functional areas may provide certain capabilities or services that may be offered to a customer For example, within a Billing functional area, such service may include international currency, web bill presentation, online credit card payment, or changes to billing frequency. As another example, the CRM function may offer automated address validation, workflow and auto-email generation, and real-time domain registration. Furthermore, certain of an organization's functional areas may include automated systems used to enable or support the particular function. For example, within the CRM functional area there may be several systems provided by such service providers as Siebel®, Sales Order Tool™, Day 2 Day™, and Web-CBC™ for example.

In at least one embodiment, in order to fully identify a specific system's capabilities, a relationship may be established for only those features offered by that system. For example, one billing system may support multiple currency while another may not. Similarly, one CRM system may offer workflow, while another does not. Once a specific system has been defined with its own set of features/capabilities, the system's status (e.g., active, pending, decommissioned), effectivity dates, and owners or responsible persons (technical and business) may also be identified and captured using the product toolkit database 102. By thus tying systems information to particular Product Instances of the global product hierarchy, the product toolkit system 100 provides the capability for a user to identify specific systems which may be provided in conjunction with specific salable products, which may be offered to customers for the Product Instance. Additional information which may be captured per Product Instance includes, but is not limited to: delivery and billing geographies, contract types and terms, sales methods (e.g., direct, partner, wholesale, web-enabled), and Service Level Agreements (SLAs).

Thus, in at least one embodiment, the product toolkit system 100 may provide a single database housing all product definitions, on a global basis, for an organization across multiple geographic locations. This single database may be, for example, the product toolkit database 102. The database definitions for the organization's product information and product component information may be selected and arranged to permit a single definition set of product components, which may be used and re-used by multiple products in multiple sales channels in multiple geographies. Accordingly, the system and method of embodiments of the present invention permits a single definition set of systems/applications to be used globally throughout an organization, with the detail of the product definition extending at least down to the product "feature" level. In this way, the product toolkit system 100 may provide the capability for global management of the product information and product component information, as well as the capability to associate each system/application with the products that use them. The system and method of embodiments of the present invention thus facilitates streamlined business processes for product definition, management, re-use of components and systems, and eliminates redundant and conflicting sources of information and reduces the amount of manpower required to manage products and systems.

Further, in at least one embodiment, the product toolkit system 100 may include an N-tier hierarchy for the definition of products and components allowing unlimited re-usability/association to other product entities. This may be accomplished, in an embodiment, by abstracting the product information and product component information into a common database format (e.g., Oracle DB) so the information can be accessed by a variety of applications including Java™ based, Corba®, or ASP™. Furthermore, product information may be identified and associated with all global geographies for all sales channels for the business entities of the organization using, for example, the product toolkit database 102. The product toolkit system 100 may, in an embodiment, include an architectural design for a generic interface to n-number of related systems (such as, for example, ordering, provisioning, billing) in any number of methods (e.g., real-time, batch, ODBC, XML) in order to tie product and component definition to the actual sale and customer information across geographies.

In at least one embodiment, the product toolkit system 100 may provide the capability to generate and output to a user several different product configuration reports 105. The product configuration reports 105 may be generated by the user interface module 303 using product information and product configuration information obtained from the product toolkit database 102. For example, upon receiving a request for a product configuration report 105 from a user station 103 or a product manager station 106, the user interface module 303 may request the report engine 302 to generate the requested report. In this request, the user interface module 303 may pass to the report engine 302 data received from the requesting user to be included in selecting and constructing a corresponding database query. The report engine 302 may format and transmit a database query or command, or a sequence thereof, to the product toolkit database 102 in order to obtain the product information and product component information needed to generate the requested report 105. Upon receipt of this information from the product toolkit database 102, the report engine 302 may render the requested report 105 and output the report 105 to the requesting user station 103 or product manager station 106. In at least one embodiment, the report request from the user station 103 or product manager station 106 may be provided in the form of an interactive page, which may be an HTML formatted page. The request may be transmitted from the user station 103 or product manager station 106 to the product toolkit server 101 via the network 104. The product toolkit server 101 may output the rendered report 105 in the form of an interactive page, which may be an HTML formatted page suitable for display using an web browser. The report 105 may be transmitted from the product toolkit server 101 to the requesting user station 103 or product manager station 106 via the network 104.

Figure 7:
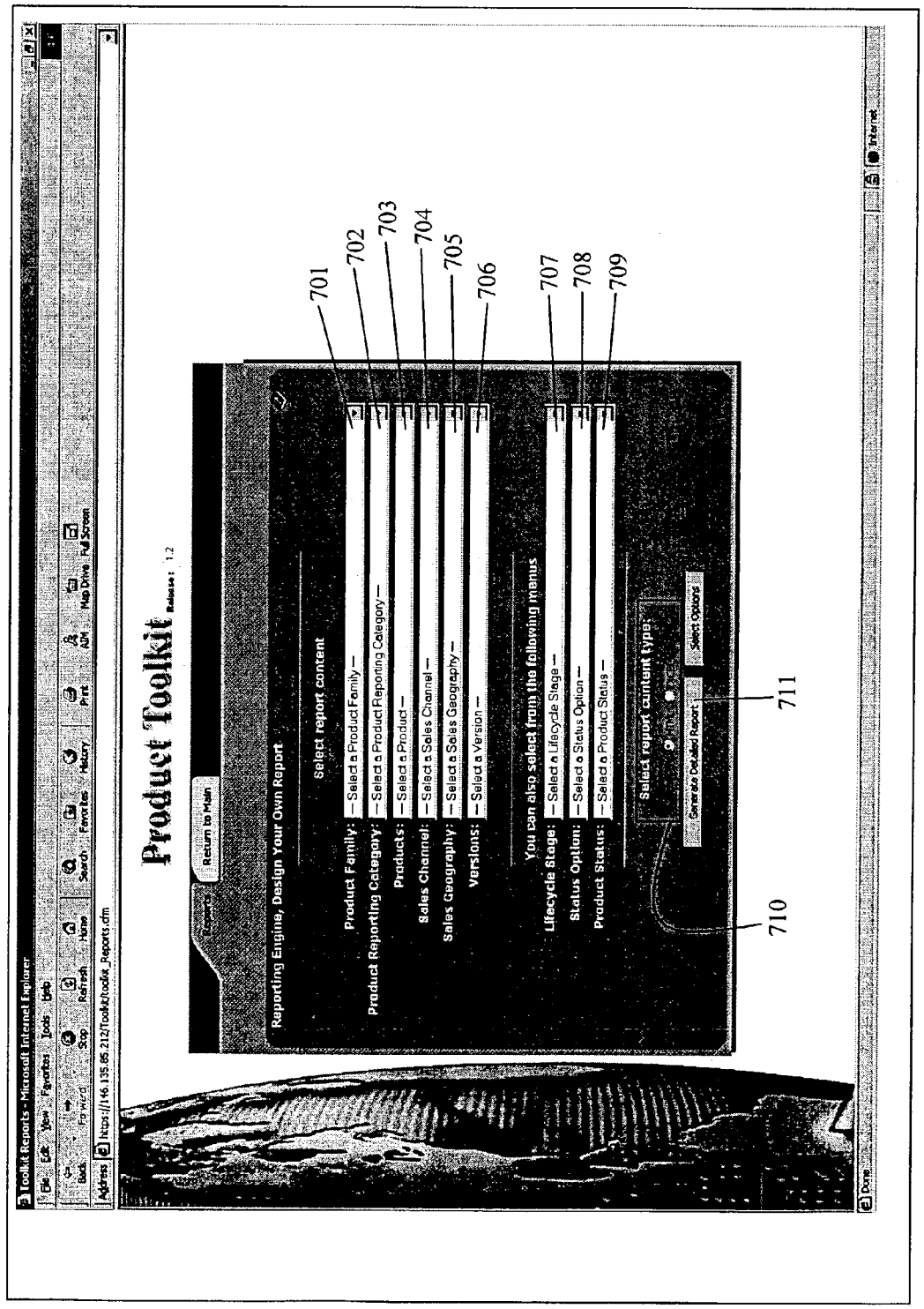
FIG. 7 is an example of a custom report request interactive page according to at least one embodiment of the invention.

In at least one embodiment, the product toolkit system 100 may provide the capability to generate and output the following product configuration reports 105 in response to receiving a corresponding request from a user having access to the requested report:

A custom report that may include interactive pages permitting a user to design her own report by interacting with the report engine 302;

A new portal report that may provide a list of new world wide web portals maintained using the product toolkit system 100;

A products report which may include a series of hierarchically arranged reports 105 pertaining to product information for a particular Product entity or object;

A components report which may include a series of hierarchically arranged reports 105 pertaining to product component information;

A users report that may provide a user activity log;

A wish list report that may provide a list of desired product features and attributes;

A bug list report that may provide a list of reported problems associated with a product object or entity, or its constituent components;

An application usage report that may provide an indication of system usage per user;

A training details report that may provide an indication of the training activities undertaken by a user with respect to the product toolkit system 100;

An intranet links report that may provide a list of World Wide Web links by Uniform Resource Locator (URL) associated with a Product Family, Reporting Category, or product object;

An individual product report that may include the URL links and product information associated with a Product Family, Reporting Category, or product object;

A report listing products by a product identifier that may also include sales status (e.g., available for sale, decommissioned) for a Product Family or Reporting Category;

A product descriptions report that may include product descriptions (based on, for example, product information) for a Product Family, Reporting Category, or product object;

A products in Europe report that may list all product objects in the product toolkit database 102 having a "Europe" sales channel;

A product hierarchy report that may show the product hierarchy among product objects and Product Family and/or Reporting Category;

A product life cycle stage report that may show the life cycle stage for a product object;

A report that may list those product objects having slipped launch dates;

A report that may list product objects, Product Family, or Reporting Category for a selected selling geography or geographies;

A supply chain management report that may list product objects associated with a particular vendor or supplier;

A system and product report that may provide the list of product objects associated with a selected system or systems, and vice versa;

A bundled products report that may provide a list of all product bundles and the product objects associated with each listed product bundle;

Upon receiving a request from a user to provide a custom report, the report engine 302 may generate and output to the user station 103 or product manager station 106 of the requesting user an interactive page for the user to provide various report generation parameters. FIG. 7 shows an example of such a custom report request interactive page 700. Referring to FIG. 7, a custom report request interactive page 700 may include pull down menu selection fields to permit the user to enter the desired product information and product component information for the requested report 105 using, for example, the pointing device 230. For example, a custom report request interactive page 700 may include a product family selection field 701, a reporting category selection field 702, a products selection field 703, a sales channel selection field 704, a sales geography selection field 705, a version selection field 706, a life cycle stage selection field 707, a status option selection field 708, and a product status selection field 709. Furthermore, the custom report request interactive page 700 may also include report content type selector 710 (e.g., HTML format or Excel™ spreadsheet format) and a detailed report generation button 711. Using the pointing device 230, for example, a user may specify to the report engine 302 which one of the available items of product information and product component information to use in rendering the custom report. Also using the pointing device 230, a user may specify the content type of the report 105 by selecting the corresponding option of the report content type selector 710. After making his selections, the user may request the product toolkit server 101 to provide the requested report 105 by, for example, selecting the detailed report generation button 711. Upon user selection of the detailed report generation button 711, the user station 103 or product manager station 106 may transmit the custom report request to the product toolkit server 101 for generation and output to the user of the requested custom report as described above.

Figure 8:
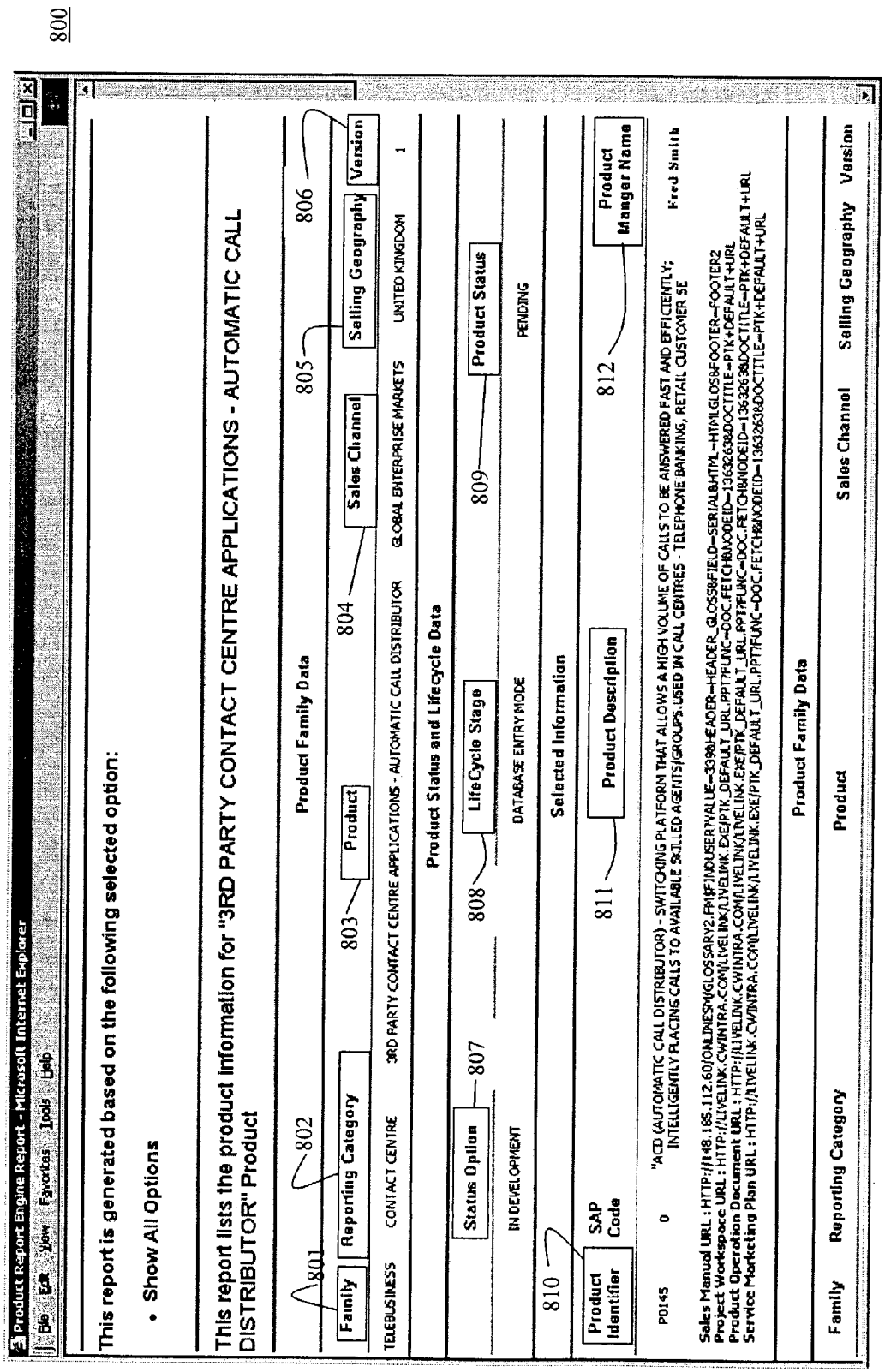
FIG. 8 is an example of a custom product configuration report according to at least one embodiment of the invention.

An example of a requested custom product configuration report 800 is shown in FIG. 8. Referring to FIG. 8, a custom product configuration report 800 may include a product family indicator 801, a reporting category indicator 802, a product name 803, a sales channel identifier 804, a selling geography description 805, a version indicator 806, a product status option 807, a life cycle stage identifier 808, a product sales status descriptor 809, a product identifier 810, a product description 811, and the responsible product manager name 812. The product status option 807 may indicate the development status of the product (e.g., in development). The product identifier 810 may be an alphanumeric identifier assigned to the product for tracking. The remaining fields, product family indicator 801, reporting category indicator 802, product name 803, sales channel identifier 804, selling geography description 805, version indicator 806, product status option 807, life cycle stage identifier 808, and product sales status descriptor 809, may be as described earlier herein. The custom product configuration report 800 may be generated by the report engine 302 and output by the product toolkit server 101 to the requesting user station 103 or product manager station 106. In at least one embodiment, the custom product configuration report 800 may be output by the product toolkit server 101 in the form of an interactive page, which may be an HTML formatted page suitable for display using an web browser. The custom product configuration report 800 may be transmitted from the product toolkit server 101 to the requesting user station 103 or product manager station 106 via the network 104.

Figure 9:
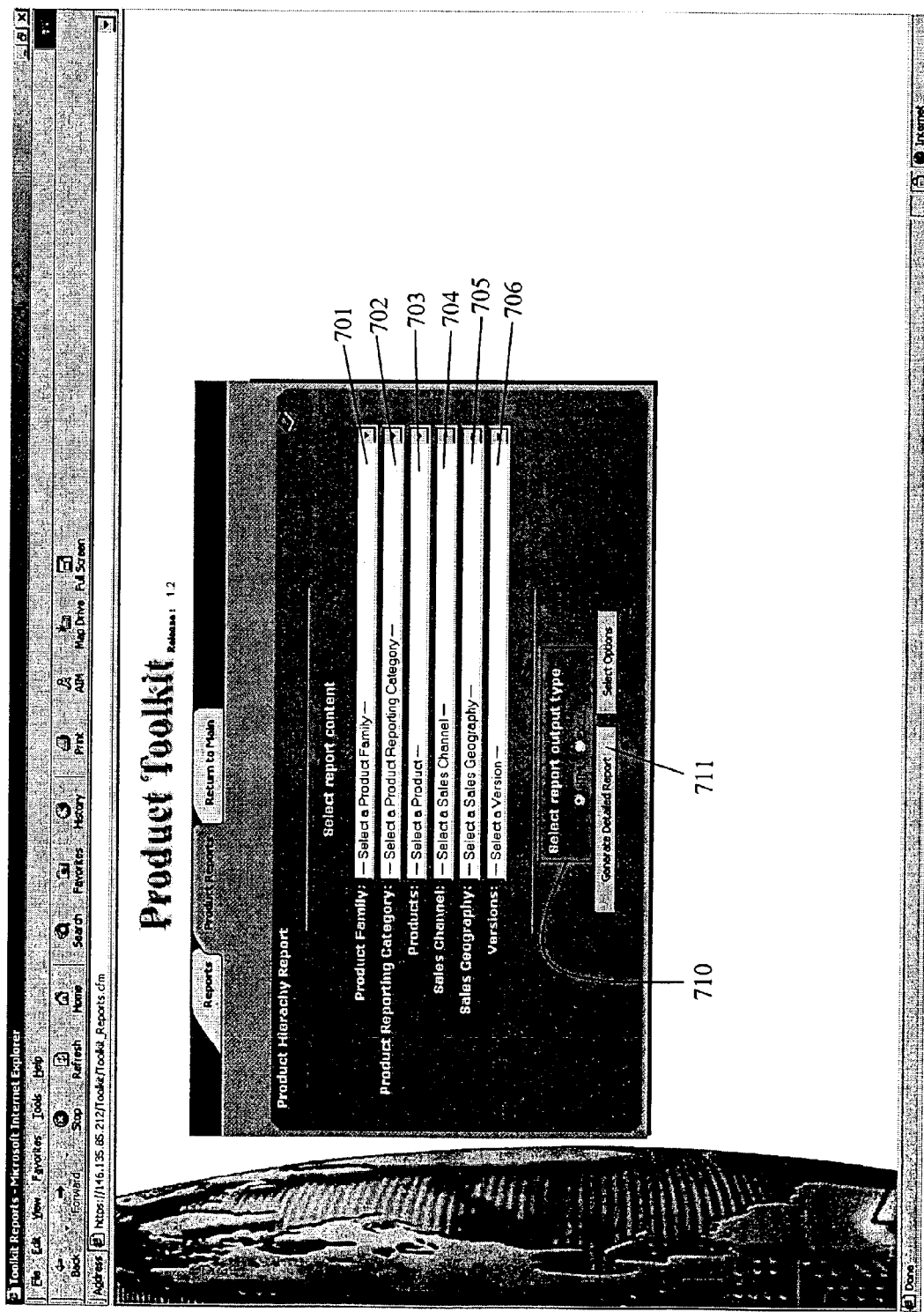
FIG. 9 is an example of a product hierarchy report request interactive page according to at least one embodiment of the invention.

Upon receiving a request from a user to provide a product hierarchy report, the report engine 302 may generate and output to the user station 103 or product manager station 106 of the requesting user an interactive page for the user to provide various report generation parameters. FIG. 9 shows an example of a product hierarchy report request interactive page 900. Referring to FIG. 9, a product hierarchy report request page 900 may include a may include pull down menu selection fields to permit the user to enter the desired product information and product component information for the requested report using, for example, the pointing device 230. For example, a product hierarchy report request interactive page 900 may include a product family selection field 701, a reporting category selection field 702, a products selection field 703, a sales channel selection field 704, a sales geography selection field 705, and a version selection field 706 as well as a report content type selector 710 (e.g., HTML format or Excel™ spreadsheet format) and a detailed report generation button 711. Using the pointing device 230, for example, a user may specify to the report engine 302 which one of the available items of product information and product component information to use in rendering the product hierarchy report. Also using the pointing device 230, a user may specify the content type of the report by selecting the corresponding option of the report content type selector 710. After making his selections, the user may request the product toolkit server 101 to provide the requested report by, for example, selecting the detailed report generation button 711. Upon user selection of the detailed report generation button 711, the user station 103 or product manager station 106 may transmit the product hierarchy report request to the product toolkit server 101 for generation and output to the user of the requested report.

An example of a requested product hierarchy report 1000 is shown in FIG. 10. Referring to FIG. 10, a product hierarchy report 1000 may include the product family indicator 801, the reporting category indicator 802, the product name 803, the sales channel identifier 804, the selling geography description 805, the version indicator 806, the product status option/product instance status 807, the life cycle stage identifier 808, the product sales status descriptor, the product identifier 810, the product description 811, the responsible product manager name 812, a reporting category description 1001, product manager contact information such as a product manager telephone number 1002, a product creation date 1003, a product effective date 1004, a product expiration date 1005, a product last update date 1006, and a product last update identifier 1007. The product hierarchy report 1000 may be generated by the report engine 302 and output by the product toolkit server 101 to the requesting user station 103 or product manager station 106. In at least one embodiment, the product hierarchy report 1000 may be output by the product toolkit server 101 in the form of an interactive page, which may be an HTML formatted page suitable for display using an web browser. The product hierarchy report 1000 may be transmitted from the product toolkit server 101 to the requesting user station 103 or product manager station 106 via the network 104.

Figure 11:
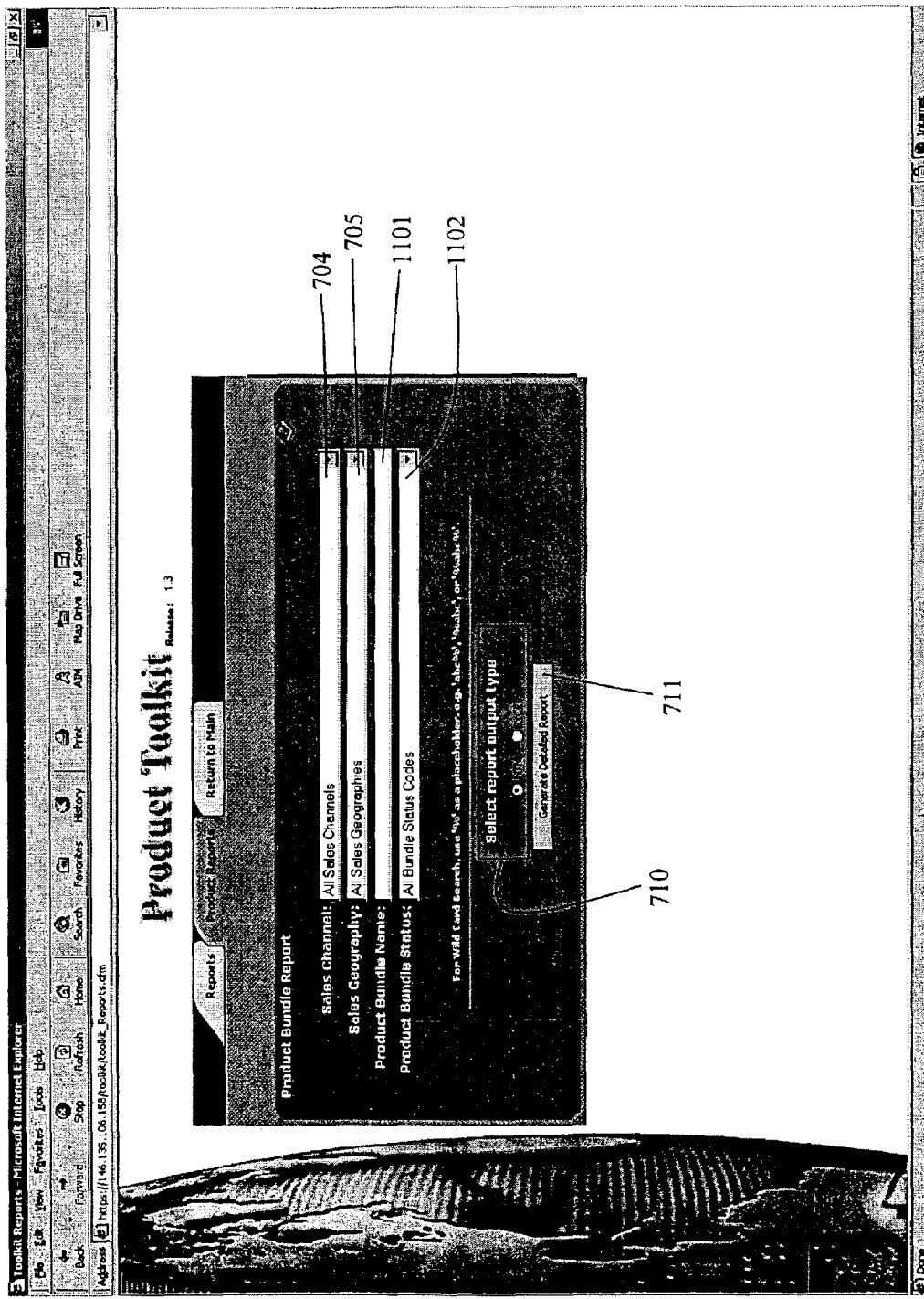
FIG. 11 is an example of a product bundle report request interactive page according to at least one embodiment of the invention.

Upon receiving a request from a user to provide a product bundle report, the report engine 302 may generate and output to the user station 103 or product manager station 106 of the requesting user an interactive page for the user to provide various product bundle report generation parameters. FIG. 11 shows an example of a product bundle report request interactive page 1100. Referring to FIG. 11, a product bundle report request page 1100 may include a may include pull down menu selection fields to permit the user to enter the desired product information and product component information for the requested report using, for example, the pointing device 230. For example, a product bundle report request interactive page 1100 may include the sales channel selection field 704, the sales geography selection field 705, a product bundle name 1101, and a product bundle status 1102, as well as the report content type selector 710 (e.g., HTML format or Excel™ spreadsheet format) and the detailed report generation button 711. Using the pointing device 230, for example, a user may specify to the report engine 302 which one of the available items of product information and product component information to use in rendering the product bundle report. Also using the pointing device 230, a user may specify the content type of the report by selecting the corresponding option of the report content type selector 710. After making his selections, the user may request the product toolkit server 101 to provide the requested report by, for example, selecting the detailed report generation button 711. Upon user selection of the detailed report generation button 711, the user station 103 or product manager station 106 may transmit the product bundle report request to the product toolkit server 101 for generation and output to the user of the requested report.

Figure 12:
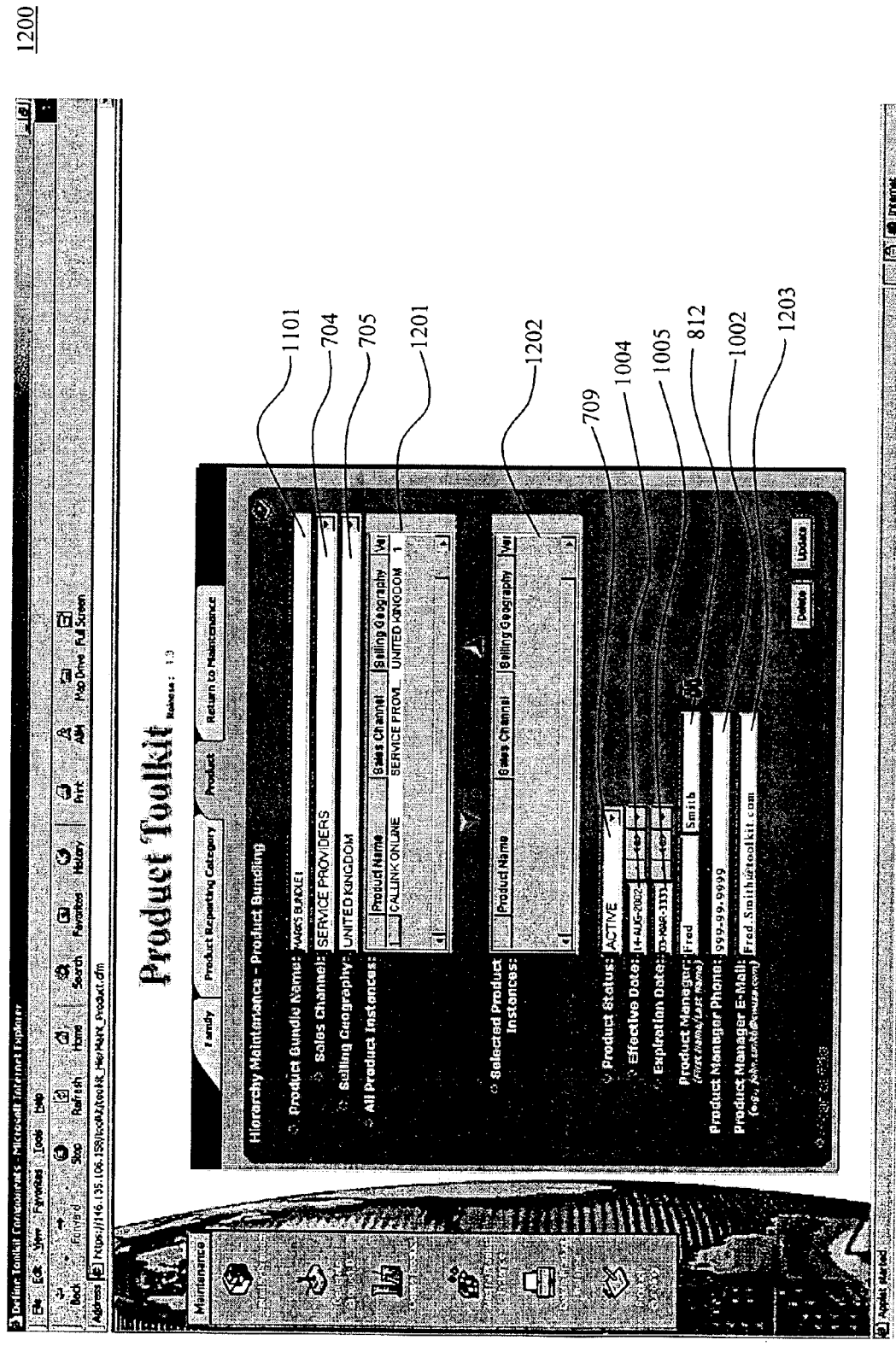
FIG. 12 is an example of a hierarchy maintenance—product bundling interactive page according to at least one embodiment of the invention.

Upon receiving a request from a supervisory user to perform hierarchy maintenance—product bundling, the report engine 302 may generate and output to the user station 103 or product manager station 106 of the requesting user an interactive page for the user to view and/or modify various product bundle parameters. FIG. 12 shows an example of a hierarchy maintenance—product bundling interactive page 1200. Referring to FIG. 12, a hierarchy maintenance—product bundling page 1200 may include a may include pull down menu selection fields to permit the user to enter the desired product information and product component information using, for example, the pointing device 230. For example, a hierarchy maintenance—product bundling interactive page 1200 may include the sales channel selection field 704, the sales geography selection field 705, the product bundle name 1101, an all product instances display field 1201, a selected product instances display field 1202, the product status field 709, the effective date 1004, the expiration date 1005, the product manager name 812, the product manager telephone number 1002, and a product manager e-mail address 1203. Using the pointing device 230, for example, a supervisory user may add or modify the above product information for the product bundle identified by the product bundle name 1101.

Figure 13:
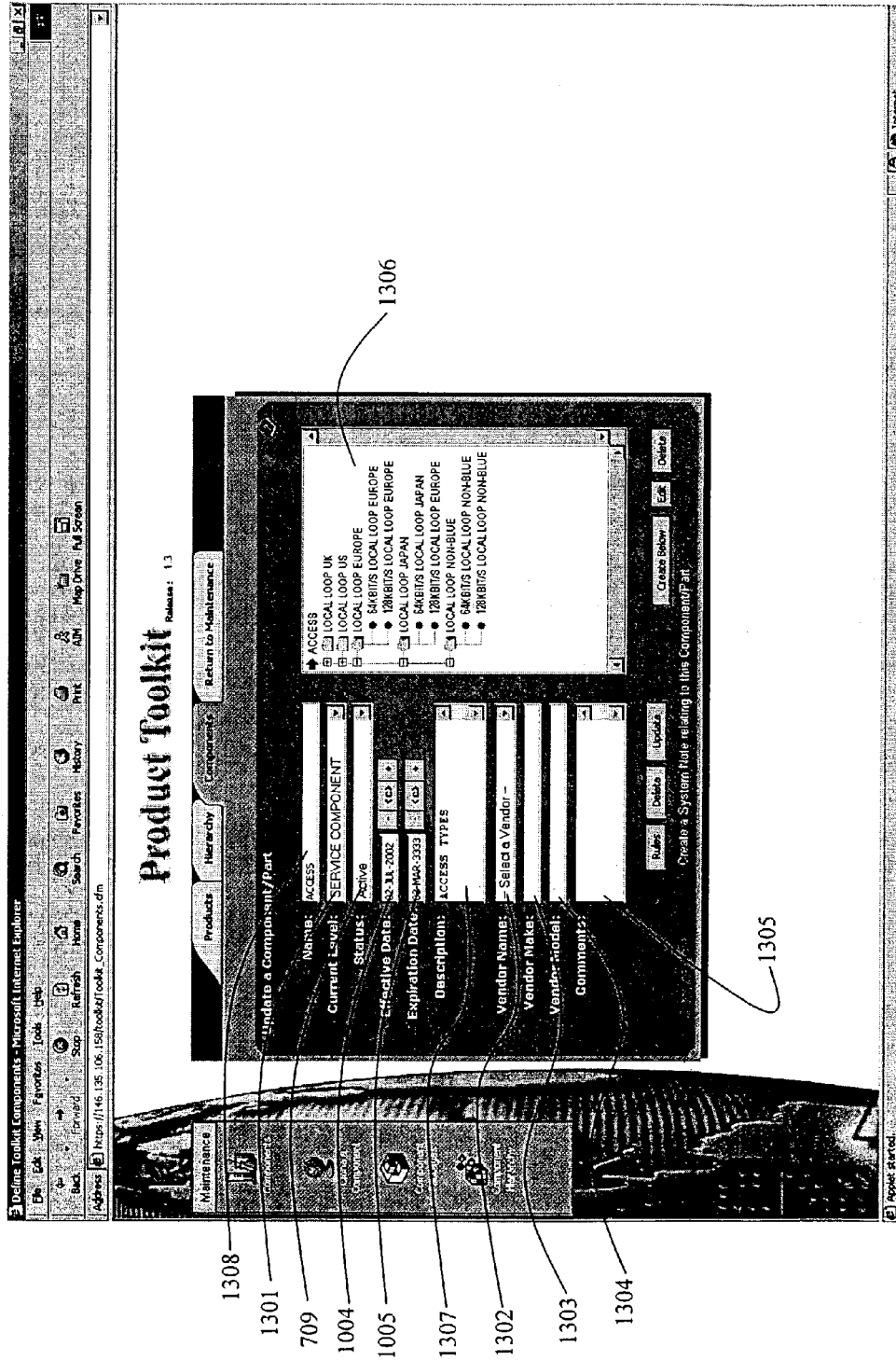
FIG. 13 is an example of a product component interactive page according to at least one embodiment of the invention.

Upon receiving a request from a supervisory user to update a component/part, the report engine 302 may generate and output to the user station 103 or product manager station 106 of the requesting user an interactive page for the user to view and/or modify various product component information parameters. FIG. 13 shows an example of a product component interactive page 1300. Referring to FIG. 13, a product component interactive page 1300 may include a may include pull down menu selection fields to permit the user to enter the desired product component information using, for example, the pointing device 230. For example, the product component interactive page 1300 may include the component name 1308 associated with the component (e.g., "Access"), a current level 1301 for the component (e.g., "Service Component"), the product status field 709 (e.g., "Active"), the effective date 1004 (e.g., "02-JUL-2002"), the expiration date 1005 (e.g., "03-MAR-3333"), a component description 1307 (e.g., "Access Types"), a vendor name 1302 for the component, a vendor make 1303 for the component, a vendor model 1304 for the component, comments 1305 for the component, and a hierarchical list 1306 indicating instances of the component. Using the pointing device 230, for example, a supervisory user may add or modify the above product component information for the component identified by the component name 1308.

Figure 14:
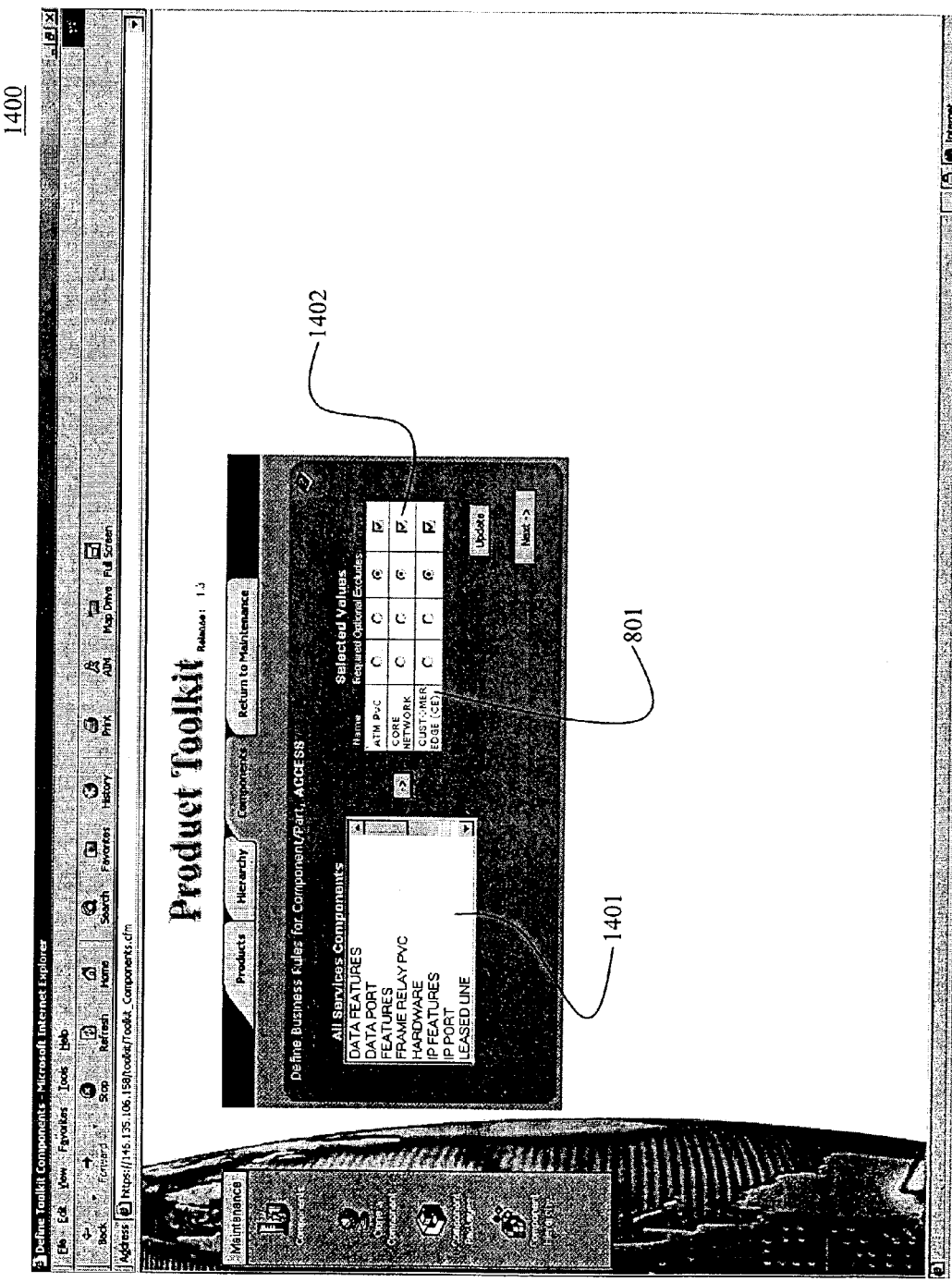
FIG. 14 is an example of a component business rules interactive page according to at least one embodiment of the invention.

Furthermore, in at least one embodiment, a supervisory user may modify the business rules associated with a product component. For example, upon receiving a request from a supervisory user to update the business rules for a component/part, the report engine 302 may generate and output to the user station 103 or product manager station 106 of the requesting user an interactive page for the user to view and/or modify various product component business rules. FIG. 14 shows an example of a component business rules interactive page 1400.

Referring to FIG. 14, a component business rules interactive page 1400 may include a may include a service selection field 1401 and a required component selection menu 1402 to permit the user to modify the desired business rules information using, for example, the pointing device 230. The service selection field 1401 may provide a list of the individual service items associated with a component (e.g., "Data Features," "Data Port" . . . ). The required component selection menu 1402 may provide a series of checkboxes by which a supervisory user may specify the relationship of the individual service features to one or more components (e.g., "required," "optional," "exclude"), which may be identified by (e.g., "ATM PVC"). For example, referring to FIG. 14, for the "Access" component all service features are shown as not being available for use with (i.e., "Excludes") the "ATM PVC" component. Using the pointing device 230, for example, a supervisory user may add or modify the above product component information for the component.

Figure 15:
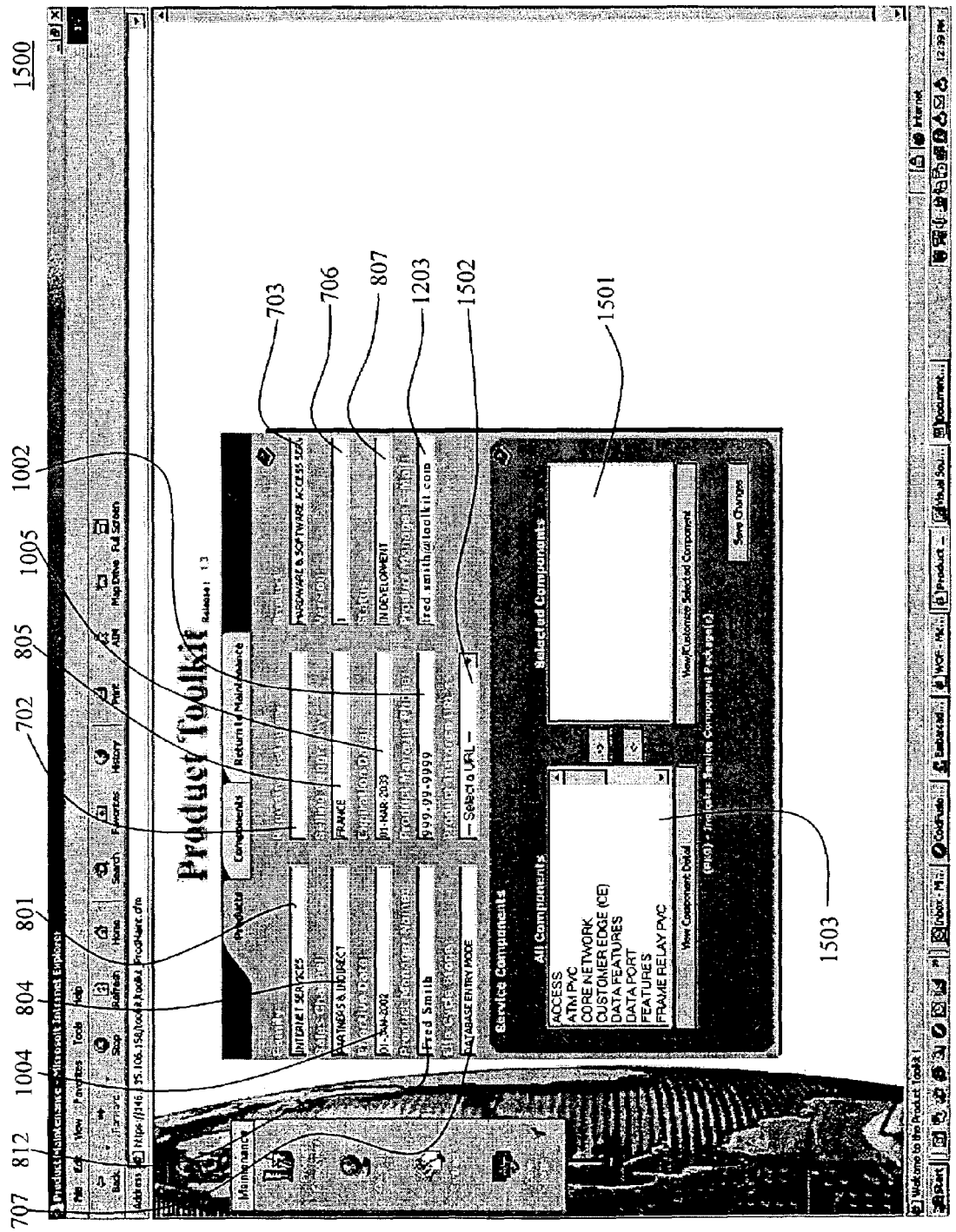
FIG. 15 is an example of a product report interactive page that includes the component/service options according to at least one embodiment of the invention.

Upon receiving a request from a user to view product information, the report engine 302 may generate and output to the user station 103 or product manager station 106 of the requesting user an interactive page for the user to view product information and product component information for the requested product. FIG. 15 shows an example of a product report interactive page 1500 that includes the component/service options available for the selected product. Referring to FIG. 15, a product report interactive page 1500 may include several descriptive fields to permit the user to view the desired product information and product component information, as well as to define user-selectable information to define a product instance. For example, the product report interactive page 1500 may include the product family 801 for the requested product, the sales channel 804, the effective date 1004, the responsible product manager name 812, the life cycle stage 707, an interactive list of the associated components 1503, the reporting category 702, the selling geography 805, the expiration date 1005, the product manager telephone number 1002, a URL address 1502 for the product, a product name 703, the product version 706, the product status 807, the product manager email address 1203, and a list of selected components 1501. Using the pointing device 230, for example, the user may specify in the list of selected components 1501 which of the associated components 1503 available for use with the product are desired to be used for this product instance.

Figure 16:
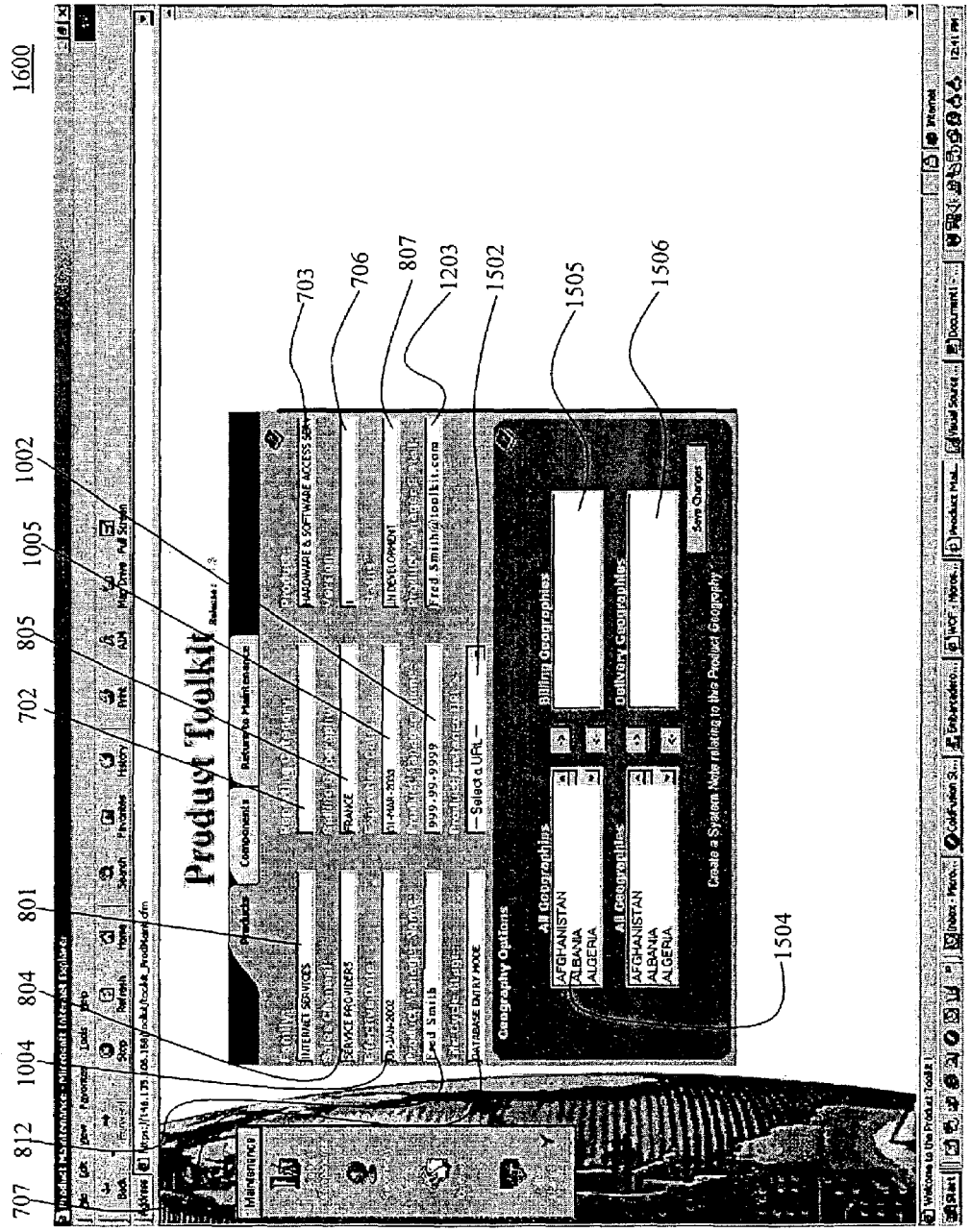
FIG. 16 is an example of a product report interactive page that includes the geography options according to at least one embodiment of the invention.

Upon receiving a request from a user to view product information with geography options, the report engine 302 may generate and output to the user station 103 or product manager station 106 of the requesting user an interactive page for the user to view product information and product component information for the requested product. FIG. 16 shows an example of a product report interactive page 1600 that includes the geography options available for the selected product. Referring to FIG. 16, a product report interactive page 1600 may include the descriptive fields as discussed above for FIG. 15 to permit the user to view the desired product information and product component information, as well as to define user-selectable geographic information to define a product instance. For example, the product report interactive page 1600 may further include a list of all geographies 1504 available for the selected product, as well as a list of billing geographies 1505 and delivery geographies 1506 available for the selected product. Using the pointing device 230, for example, the user may specify which of the geographies from the available geographies 1504 to be used for billing geographies 1505 and delivery geographies 1506 for this product instance.

Figure 17:
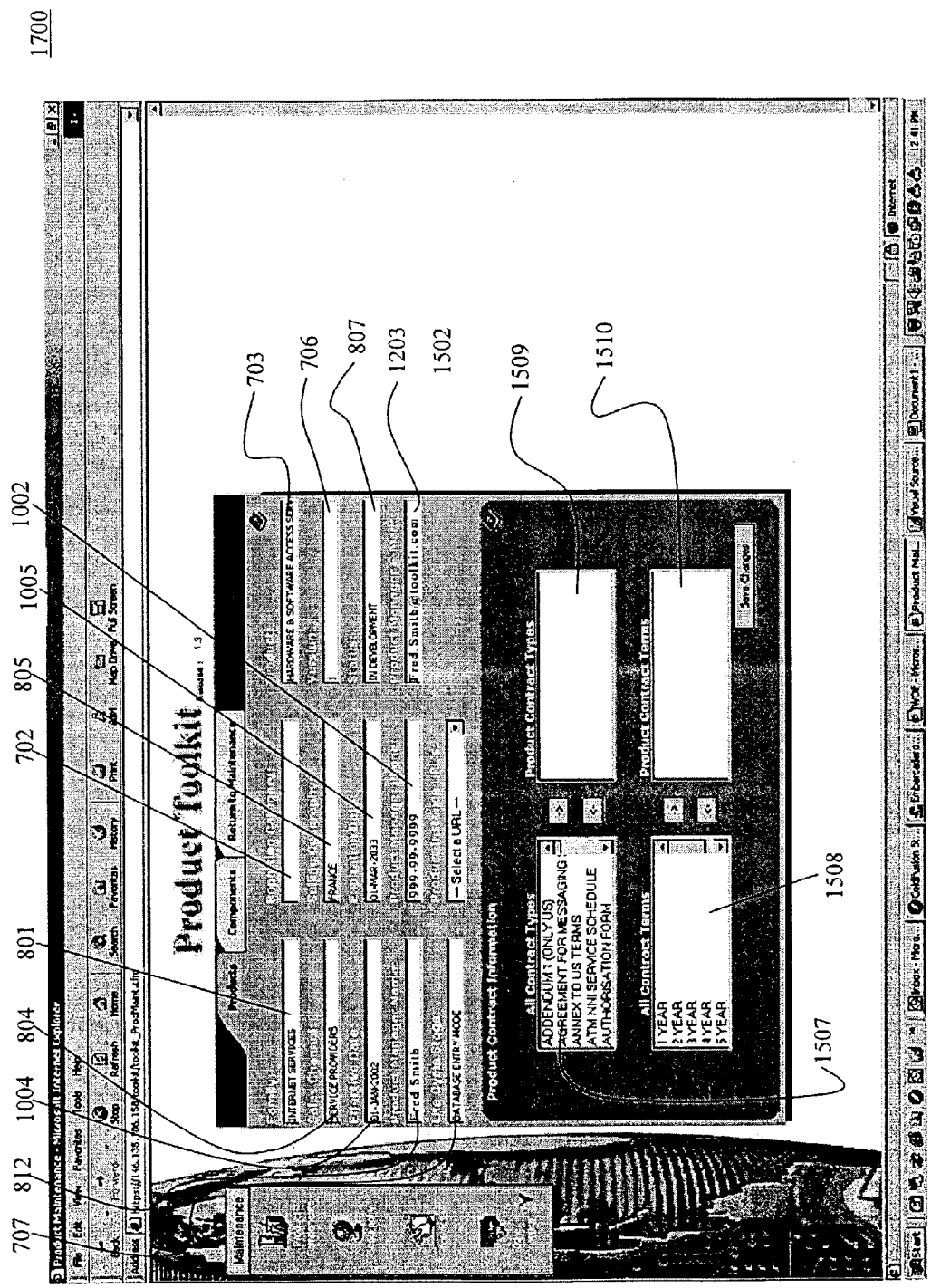
FIG. 17 is an example of a product report interactive page that includes contract information according to at least one embodiment of the invention.

Upon receiving a request from a user to view product information with product contract information, the report engine 302 may generate and output to the user station 103 or product manager station 106 of the requesting user an interactive page for the user to view product information and product component information for the requested product. FIG. 17 shows an example of a product report interactive page 1700 that includes the contract information available for the selected product. Referring to FIG. 17, a product report interactive page 1700 may include the descriptive fields as discussed above to permit the user to view the desired product information and product component information, as well as to define user-selectable contract information to define a product instance. For example, the product report interactive page 1700 may further include a list of all contract types 1507 and all contract terms 1508 available for the selected product, as well as a list of the selected product contract types 1509 and selected product contract terms 1510 selected for use with the product. Using the pointing device 230, for example, the user may specify which of the contract types and contract terms from the available contract types 1507 and contract terms 1508 to be used for the selected contract types 1509 and selected contract terms 1510 for this product instance.

Figure 18:
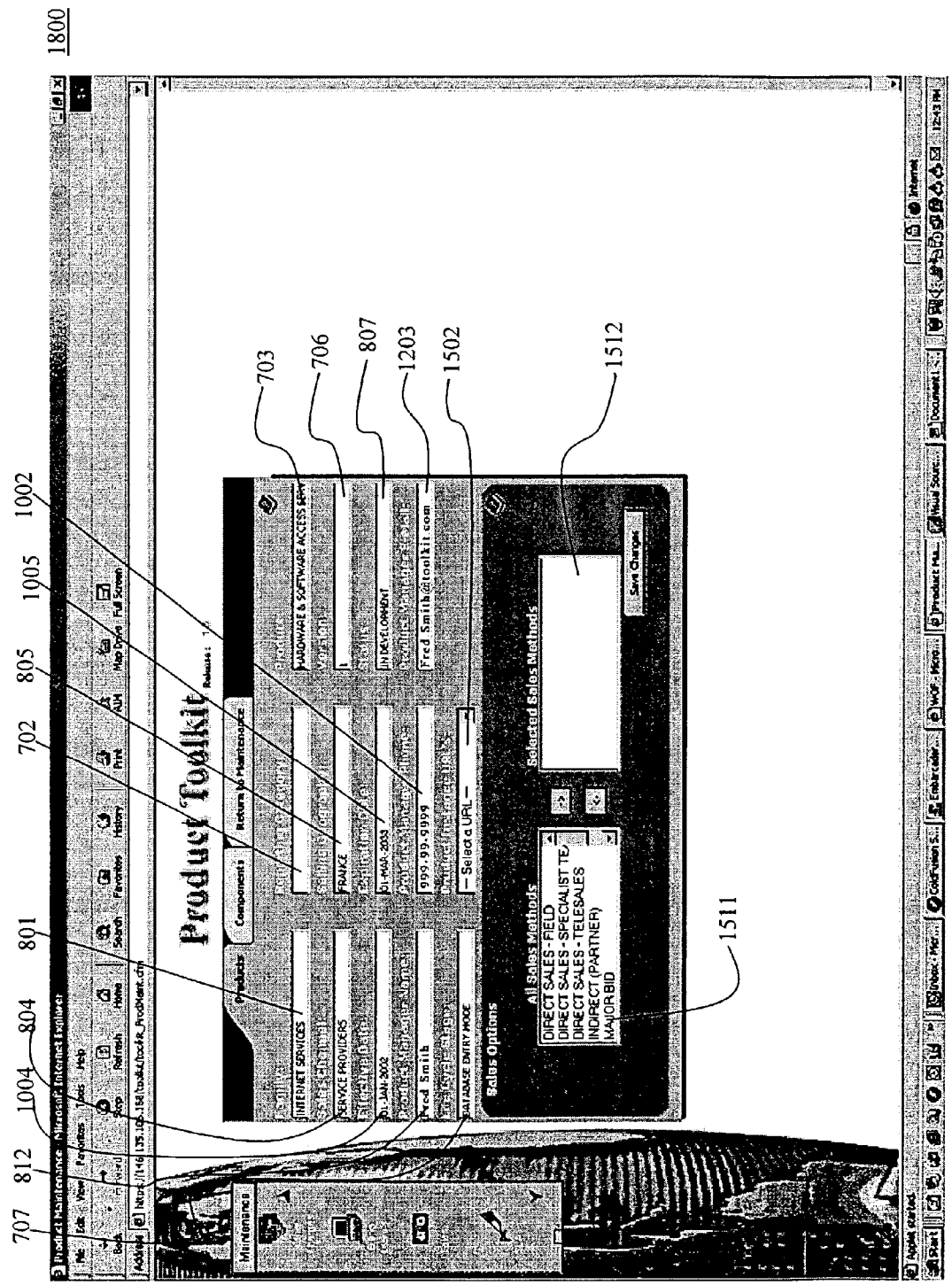
FIG. 18 is an example of a product report interactive page that includes sales method information according to at least one embodiment of the invention.

Upon receiving a request from a user to view product information with sales methods information, the report engine 302 may generate and output to the user station 103 or product manager station 106 of the requesting user an interactive page for the user to view product information and product component information for the requested product. FIG. 18 shows an example of a product report interactive page 1800 that includes the sales method information available for the selected product. Referring to FIG. 18, a product report interactive page 1800 may include the descriptive fields as discussed above to permit the user to view the desired product information and product component information, as well as to define user-selectable sales method information to define a product instance. For example, the product report interactive page 1800 may further include a list of all sales methods 1511 available for the selected product, as well as a list of the selected sales methods 1512 selected for use with the product. Using the pointing device 230, for example, the user may specify which of the sales methods from the available sales methods 1511 to be used for the selected sales methods 1512 for this product instance.

Figure 19:
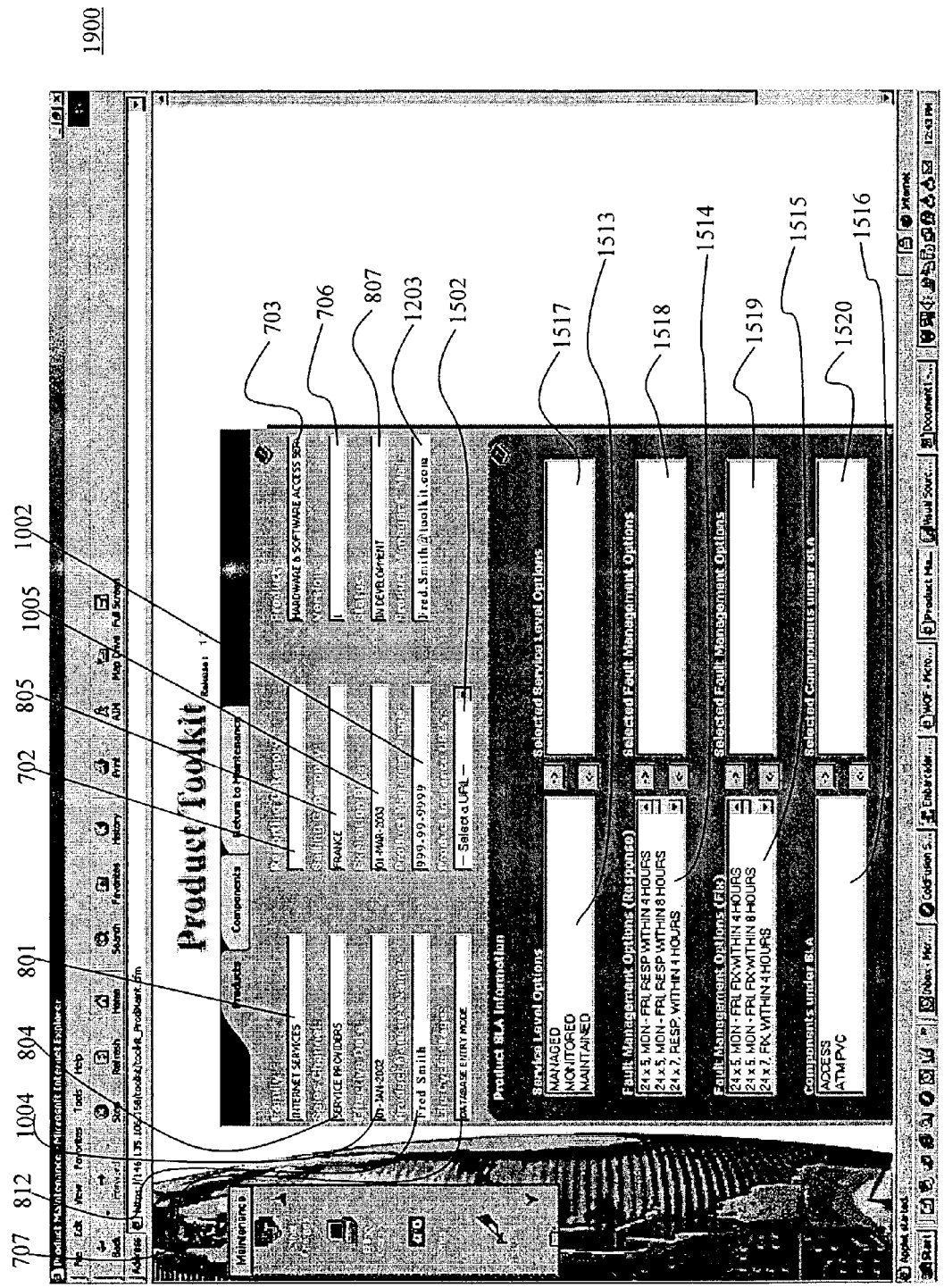
FIG. 19 is an example of a product report interactive page that includes service level agreement information according to at least one embodiment of the invention.

Upon receiving a request from a user to view product information with Service Level Agreement (SLA) information, the report engine 302 may generate and output to the user station 103 or product manager station 106 of the requesting user an interactive page for the user to view product information and product component information for the requested product. FIG. 19 shows an example of a product report interactive page 1900 that includes the SLA information available for the selected product. Referring to FIG. 19, a product report interactive page 1900 may include the descriptive fields as discussed above to permit the user to view the desired product information and product component information, as well as to define user-selectable service level information to define a product instance. For example, the product report interactive page 1900 may further include lists of all service level options 1513, fault management options (response) 1514, fault management options (fix) 1515, and components under SLA 1516 available for the selected product. In at least one embodiment, the product report interactive page 1900 may further include lists of the corresponding selected service level options 1517, selected fault management options (response) 1518, selected fault management options (fix) 1519, and selected components under SLA 1520. Using the pointing device 230, for example, the user may specify which of the available service level options 1513, fault management options (response) 1514, fault management options (fix) 1515, and components under SLA 1516 sales methods to be selected (as indicated in lists 1517-1520) for this product instance.

Figure 20:
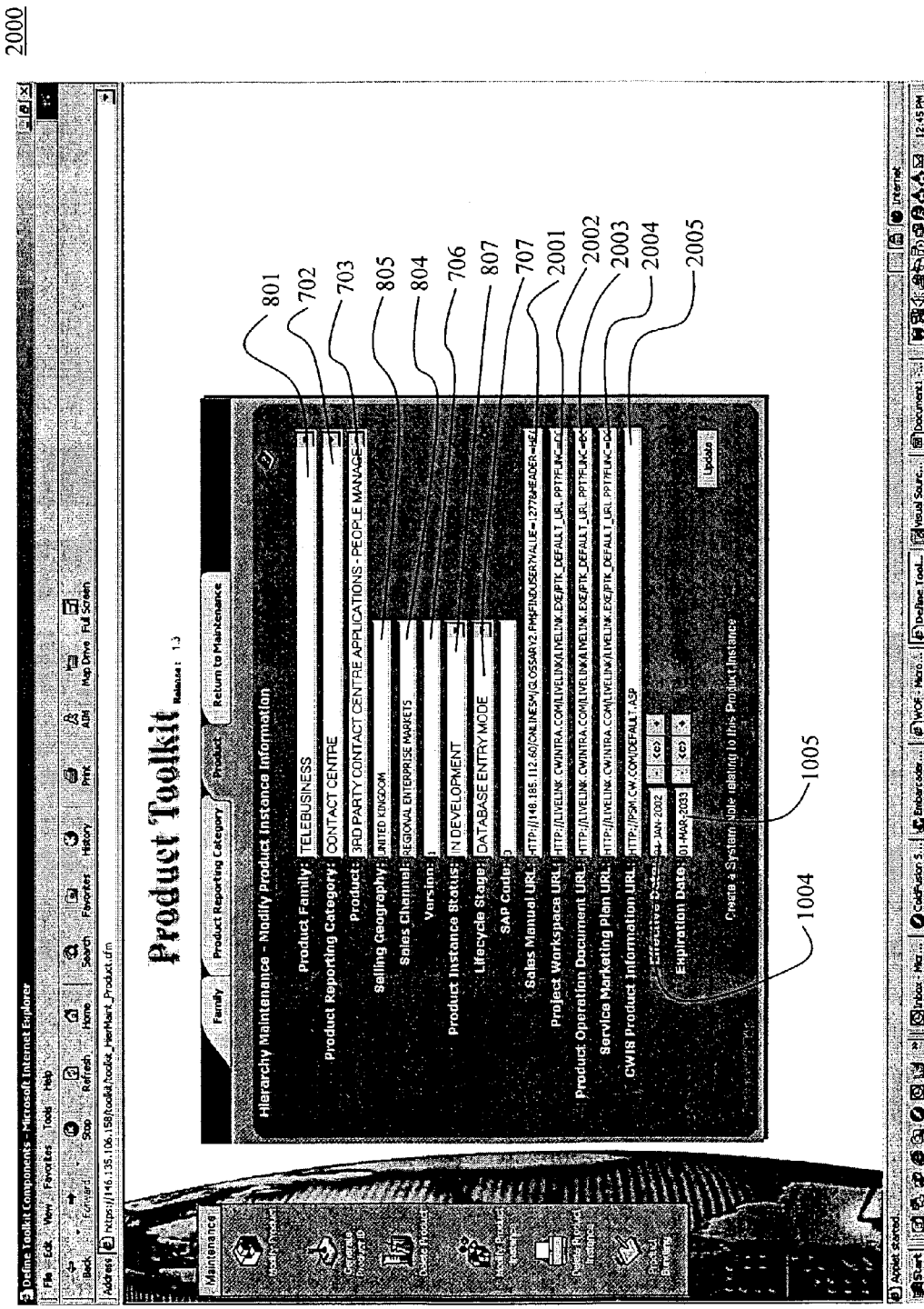
FIG. 20 is an example of a product report interactive page that includes product instance information according to at least one embodiment of the invention.

Finally, in at least one embodiment a supervisory user may request the product toolkit system 100 to modify the product information associated with a product instance. For example, upon receiving a request from a supervisory user to modify product information for a product instance, the report engine 302 may generate and output to the user station 103 or product manager station 106 of the requesting user an interactive page for the supervisory user to view and modify product information for the requested product instance. FIG. 20 shows an example of a product instance report interactive page 2000 that includes the product information associated with a particular product instance. Referring to FIG. 20, a product instance report interactive page 2000 may include several descriptive fields to permit the user to view and/or modify the desired product information for a product instance. Some of these fields may include pull down menus for selectable information using, for example, the pointing device 230. Other fields may permit modification using, for example, the data entry device 235. In an embodiment, the product instance report interactive page 2000 may include the product family 801 for the requested product instance, the sales channel 804, the effective date 1004, the life cycle stage 707, the reporting category 702, the selling geography 805, the expiration date 1005, a product name 703, the product version 706, the product status 807, as well as URLs for World Wide Web links to sources of additional information pertinent to the product instance including, but not limited to, a sales manual URL 2001, a project workspace URL 2002, a product operation document URL 2003, a service marketing plan URL 2004, and a CWIS product information URL 2005. Using the pointing device 230 and the data entry device 235, for example, the user may select or modify the product information associated with the particular product instance.

Each of the examples of the interactive product configuration reports 105 shown in FIGS. 7 through 20 may be output by the user interface module 303 in the form of one or more browser formatted pages using, for example, the display 245.

Users of the product toolkit system 100 may include product managers, read-only/reporting audience, supervisory users for baseline definitions of the global product hierarchy and its components, and technical users for population and maintenance of systems/features data.

Thus, a system and methods for a product toolkit has been shown that maintains product information and product component information as a global product hierarchy to capture all components, systems, and other relevant information on a product-by-product basis for an organization. The product toolkit product information may be further utilized via automated interfaces for sales force automation, global ordering, billing and provisioning systems employed by an organization in the enablement and management of its product suite.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A product toolkit system, comprising:
a product toolkit server including a report engine;
a database coupled to the product toolkit server, the database configured, constructed and adapted to store and maintain product information corresponding to at least one of network service products or computer service products and product component information corresponding to components of said products, wherein at least some of said products may be provided to users under Service Level Agreements (SLAs) with said users, the SLAs including at least one of network service performance metrics for said network service products or computer service performance metrics for said computer service products;
the product toolkit server being configured to arrange product information and product component information to form a global product hierarchy;
the product toolkit server being further configured to determine at least one product instance defining a particular product offering selected from among products and product components of the global product hierarchy based on user-entered product selection information, said product selection information including SLA information corresponding to said particular product offering, the SLA information including at least one of network service performance metrics or computer service performance metrics;
the report engine being configured to produce at least one product configuration report based at least in part on said user-provided product selection information, and on product information and product component information of the global product hierarchy, the at least one product configuration report including Service Level Agreement information;
the product toolkit server being further configured to output the at least one product configuration report to a user station using a network; and
the product toolkit server being further configured to output an alert message to the user station via the network in response to a product life cycle management stage information entering a decommissioned stage.

2. The system of claim 1, wherein the user station includes a graphical user interface and wherein the user station is configured to output to a user the product configuration report received from the product toolkit server based upon the product instance using the graphical user interface.

3. The system of claim 2, wherein the user station is a product manager station.

4. The system of claim 1, wherein the report engine is further configured to produce the at least one product configuration report according to a plurality of views.

5. The system of claim 1, wherein the user is a supervisory user.

6. The system of claim 5, wherein the product toolkit server is further configured to accept additions and modifications to product information and product component information from the supervisory user at a product manager station.

7. The system of claim 6, wherein the product toolkit server is further configured to maintain an audit history of additions or modifications made to the product information and product component information by the supervisory user.

8. The system of claim 1, wherein the report engine is further configured to produce the at least one product configuration report to include a product hierarchy report.

9. The system of claim 1, wherein the report engine is further configured to produce the at least one product configuration report to include a product bundle report.

10. The system of claim 1, wherein the report engine is further configured to produce the at least one product configuration report including component/service options.

11. The system of claim 1, wherein the report engine is further configured to produce the at least one product configuration report including geography options.

12. The system of claim 1, wherein the report engine is further configured to produce the at least one product configuration report including contract information.

13. The system of claim 1, wherein the report engine is further configured to produce the at least one product configuration report including sales methods information.

14. The system of claim 1, wherein the report engine is further configured to produce the at least one product configuration report including a product instance.

15. The system of claim 1, wherein the user station includes a graphical user interface and wherein the user station is configured to output to a user the product configuration report received from the product toolkit server based upon the product instance using the graphical user interface, and
  wherein the report engine is further configured to produce the at least one product configuration report according to a plurality of views, and
  wherein the report engine is further configured to produce the at least one product configuration report to include one or more of:
  a product hierarchy report; a product bundle report; component/service options; geography options; contract information; sales methods information; and a product instance.

16. The system of claim 1, wherein the SLAs further include fault management metrics for said products.

17. The system of claim 1, wherein the products are provided by a single enterprise.

18. The system of claim 1, wherein the product information for a product includes the product lifecycle stage for the product.

19. A system, comprising:
  (A) a server;
  (B) a database coupled to the server, and constructed and adapted to store and maintain product information corresponding to at least one of network service products or computer service products and product component information corresponding to components of said products;
  the server being configured:
    (a) to arrange product information and product component information to form a global product hierarchy;
    (b) to determine at least one product instance defining a particular product offering based on user-entered product selection information including service level agreement (SLA) information corresponding to said at least one product instance, the SLAs information including at least one of network service performance metrics or computer service performance metrics,
  (C) a report engine being configured to produce at least one product configuration report based at least in part on user-provided product selection information and on product information and product component information of the global product hierarchy; and
  (D) a graphical user interface (GUI) supporting entry of said user-provided product selection information and containing a first region which, when selected, causes said report engine to produce a product configuration report based on and including service level agreement information corresponding to said at least one product instance, the SLA information including at least one of network service performance metrics or computer service performance metrics.

20. A system as in claim 19 wherein said GUI contains a second region, distinct from said first region, which, when selected, causes said report engine to produce a product configuration report including service level options for said user-entered product selection.

21. A system as in claim 19 wherein said GUI contains a third region, distinct from said first region, which, when selected, causes said report engine to produce a product configuration report including fault management options for said user-entered product selection.

22. The system of claim 19, wherein the SLAs further include fault management metrics for said products.

23. The system of claim 19, wherein the products are provided by a single enterprise.

24. The system of claim 19, wherein the product information for a product includes the product lifecycle stage for the product.

25. A system comprising:
  (A) a server;
  (B) a database coupled to the server, and constructed and adapted to store and maintain product information corresponding to at least one of network service products or computer service products and product component information corresponding to components of said products;
  the server being configured:
    (a) to form a product hierarchy from said product information and said product component information; and
    (b) to determine at least one product instance in said product hierarchy defining a particular product offering based on user-entered product selection information, said product-selection information including service level agreement (SLA) information corresponding to said at least one product instance, the SLAs including at least one of network service performance metrics or computer service performance metrics; and
    (c) to produce at least one product configuration report based at least in part on product information and product component information of the global product hierarchy, the at least one product configuration report including service level agreement information corresponding to said at least one product instance, the SLA information including at least one of network service performance metrics or computer service performance metrics.

26. The system of claim 25, wherein the SLAs further include fault management metrics for said products.

27. The system of claim 25, wherein the products are provided by a single enterprise.

28. The system of claim 25, wherein the product information for a product includes the product lifecycle stage for the product.

* * * * *